US012591201B2

(12) United States Patent
Hou et al.

(10) Patent No.: US 12,591,201 B2
(45) Date of Patent: Mar. 31, 2026

(54) ADAPTER, CARTRIDGE, AND IMAGE FORMING APPARATUS

(71) Applicant: Zhuhai Pantum Electronics Co., Ltd., Zhuhai (CN)

(72) Inventors: Shujia Hou, Zhuhai (CN); Feng Chen, Zhuhai (CN); Shun Qian, Zhuhai (CN)

(73) Assignee: Zhuhai Pantum Electronics Co., Ltd., Zhuhai (CN)

(*) Notice: Subject to any disclaimer, the term of this patent is extended or adjusted under 35 U.S.C. 154(b) by 0 days.

(21) Appl. No.: 18/767,573

(22) Filed: Jul. 9, 2024

(65) Prior Publication Data

US 2025/0021046 A1 Jan. 16, 2025

(30) Foreign Application Priority Data

Jul. 10, 2023 (CN) ......................... 202310845516.5

(51) Int. Cl.

| | |
|---|---|
| ***G03G 15/00*** | (2006.01) |
| ***G03G 21/16*** | (2006.01) |
| ***G03G 21/18*** | (2006.01) |

(52) U.S. Cl.
CPC ..... *G03G 21/1871* (2013.01); *G03G 21/1647* (2013.01); *G03G 21/1652* (2013.01); *G03G 21/1842* (2013.01)

(58) Field of Classification Search
CPC ........... G03G 21/1647; G03G 21/1652; G03G 21/1842; G03G 21/1871
USPC .................................... 399/90, 107, 110, 111
See application file for complete search history.

(56) References Cited

U.S. PATENT DOCUMENTS

| | | | | |
|---|---|---|---|---|
| 11,454,901 | B2 * | 9/2022 | Ao | G03G 21/1821 |
| 2015/0212482 | A1 | 7/2015 | Kojima | |
| 2022/0334532 | A1 | 10/2022 | Fujiwara | |

FOREIGN PATENT DOCUMENTS

| | | | |
|---|---|---|---|
| EP | 1582942 | A2 | 10/2005 |
| EP | 1953603 | B1 | 8/2008 |
| JP | 2001005257 | A | 1/2001 |
| JP | 2010054828 | A | 3/2010 |
| JP | 2011107645 | * | 6/2011 |
| WO | 2014141444 | A1 | 9/2014 |

* cited by examiner

*Primary Examiner* — Hoan H Tran
(74) *Attorney, Agent, or Firm* — Anova Law Group, PLLC

(57) ABSTRACT

An adapter is installed on a cartridge detachably disposed on a main body of an image forming apparatus. The main body includes a first conductive contact and a protective structure. The protective structure is disposed on a rear frame of the main body. The protective structure includes a protective element. When the cartridge is not inserted into the main body, the protective element is in a first position to protect the first conductive contact. The cartridge includes a housing, an accommodation part, and a second conductive contact. The accommodation part is disposed on the housing. The second conductive contact is used to electrically connect with the first conductive contact. The adapter includes a pressing element that is used to cooperate with the protective structure.

20 Claims, 23 Drawing Sheets

ADAPTER, CARTRIDGE, AND IMAGE FORMING APPARATUS

CROSS-REFERENCE TO RELATED APPLICATION

This application claims priority to Chinese Patent Application No. 202310845516.5, filed on Jul. 10, 2023, the entire content of which is incorporated herein by reference.

TECHNICAL FIELD

The present disclosure relates to the technical field of printing equipment and, in particular, to an adapter, a cartridge, a cartridge assembly, and an image forming apparatus.

BACKGROUND

An image forming apparatus is an apparatus that forms an image on a medium through imaging processing technology. The image forming apparatus includes a main body and a toner cartridge assembly composed of a plurality of toner cartridges. The main body is provided with an imaging assembly. The toner cartridge is usually detachably installed into the main body and can provide toner for printing to the imaging assembly. A first conductive contact is arranged on a side of the main body of the image forming apparatus, and a second conductive contact is arranged on a toner cartridge. When the toner cartridge is installed into the main body of the image forming apparatus, the first conductive contact contacts and is electrically connected to the second conductive contact. When the toner in the toner cartridge is exhausted, it needs to be replaced with a new one.

When a user replaces the toner cartridge, due to the movement of the toner cartridge during the installation and removal process of the toner cartridge, a certain amount of toner will be scattered, and the scattered toner will adhere to the first conductive contact on the side of the main body of the image forming apparatus, causing contamination of a first conductive terminal on the side of the main body of the image forming apparatus. After replacing the toner cartridge, poor contact between the second conductive contact on the toner cartridge and the first conductive contact on the side of the main body will occur, affecting the normal operation of the image forming apparatus.

In addition, when the user does not install the toner cartridge into the image forming apparatus, and a foreign object can enter the image forming apparatus and scratch the first conductive contact on the side of the main body of the image forming apparatus, causing damage to the first conductive contact. After the toner cartridge is installed, there will be poor contact between the second conductive contact on the toner cartridge and the first conductive contact on the side of the main body, making the image forming apparatus unable to recognize the toner cartridge, and the image forming apparatus will further issue an error alarm, causing inconvenience to the user.

SUMMARY

One aspect of the present disclosure provides an adapter that is installed on a cartridge. The cartridge is detachably disposed on a main body of an image forming apparatus. The main body of the image forming apparatus has a first conductive contact and a protective structure. The protective structure is disposed on a rear frame of the main body of the image forming apparatus. The protective structure has a protective element. When the cartridge is not inserted into the main body of the image forming apparatus, the protective element is in a first position to protect the first conductive contact. The cartridge includes a housing, an accommodation part, and a second conductive contact. The accommodation part is disposed on the housing. The second conductive contact is used to electrically connect with the first conductive contact. The adapter has a pressing element. The pressing element is used to cooperate with the protective structure. When the adapter is installed on the cartridge as well as the cartridge is inserted into the main body of the image forming apparatus and installed in place, the protective element is in a second position and accommodated in the accommodation part. The protective element releases a protection of the first conductive contact, achieving an electrical connection between the second conductive contact of the cartridge and the first conductive contact.

One aspect of the present disclosure provides a cartridge detachably disposed on a main body of an image forming apparatus. The main body of the image forming apparatus includes a first conductive contact and a protective structure. The protective structure is disposed on a rear frame of the main body of the image forming apparatus. The protective structure has a protective element. When the cartridge is not inserted into the main body of the image forming apparatus, the protective element is in a first position to protect the first conductive contact. The cartridge has a housing, a second conductive contact, an accommodation part, and a pressing element. The housing has an end surface. The second conductive contact is configured to electrically connect the first conductive contact. The accommodation part is disposed on the housing. The pressing element is disposed on the housing and configured to cooperate with the protective structure. When the cartridge is inserted into the main body of the image forming apparatus and installed in place, the protective element is in a second position and accommodated in the accommodation part. The protective element releases a protection of the first conductive contact, and achieving an electrical connection between the second conductive contact and the first conductive contact.

Another aspect of the present disclosure provides a cartridge assembly detachably installed on a main body of an image forming apparatus. The cartridge assembly has a plurality of cartridges. The main body of the image forming apparatus includes a first conductive contact and a protective structure. The protective structure is disposed on a rear frame of the main body of the image forming apparatus. The protective structure has a protective element. When the cartridge is not inserted into the main body of the image forming apparatus, the protective element is in a first position to protect the first conductive contact. The cartridge has a housing, a second conductive contact, an accommodation part, and a pressing element. The housing has an end surface. The second conductive contact is configured to electrically connect the first conductive contact. The accommodation part is disposed on the housing. The pressing element is disposed on the housing and configured to cooperate with the protective structure. When the cartridge is inserted into the main body of the image forming apparatus and installed in place, the protective element is in a second position and accommodated in the accommodation part. The protective element releases a protection of the first conductive contact, and achieving an electrical connection between the second conductive contact and the first conductive contact. When the cartridge assembly is installed on the main body of the image forming apparatus, the plurality of the cartridges is arranged in a row. Sizes of pressing elements of the plurality of the cartridges are different.

BRIEF DESCRIPTION OF THE DRAWINGS

In order to better convey embodiments of the present disclosure or the technical solutions, a brief introduction will be described below to the drawings that need to be used in the description of embodiments or technical solutions. Obviously, the drawings in the following description are some embodiments of the present disclosure. For those persons of ordinary skill in the art, other drawings can be obtained based on these drawings without exerting any creative effort.

DETAILED DESCRIPTION OF THE EMBODIMENTS

Figure 1:
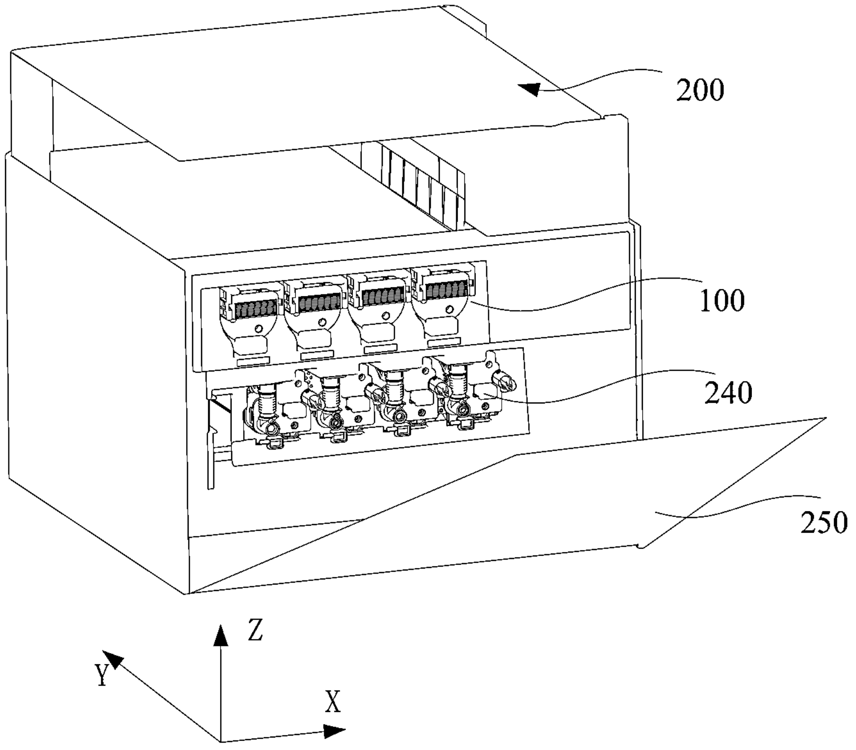
FIG. 1 illustrates a schematic diagram of opening the front cover of the main body of the image forming apparatus according to various embodiments of the present disclosure.

As mentioned in the background, an image forming apparatus has an issue of poor contact between a toner cartridge and a conductive contact on a side of a main body of the image forming apparatus after replacing the toner cartridge. The origin of the issue is when a toner in the toner cartridge is exhausted, the toner cartridge needs to be replaced with a new one. However, during the process of replacing the toner cartridge, there is a phenomenon that a first conductive contact on the side of the main body of the image forming apparatus is adhered by toner, and the first conductive contact is contaminated or damaged, causing a poor contact between a replaced toner cartridge and the first conductive contact on the side of the main body. This affects the normal operation of the image forming apparatus.

To address the technical issue, embodiments of the present disclosure provide an adapter, a cartridge, a cartridge assembly, and an image forming apparatus. The adapter can be installed on the toner cartridge, and the adapter cooperates with a protective structure of the main body of the image forming apparatus through its pressing element. When the toner cartridge with the adapter is inserted into the main body and installed in place, the protective element is in a second position and is accommodated in an accommodation cavity of the toner cartridge and releases the protection of the first conductive contact. The first conductive contact is exposed in the accommodation cavity, so that the first conductive contact and the second conductive contact are electrically connected. Conversely, when the toner cartridge with the adapter is not inserted into the main body, the protective element is in the first position and protects first conductive contact.

Such arrangement can cooperate with the protective structure during the process of replacing the toner cartridge. The protective element protects the first conductive contact as well as prevents the first conductive contact from being adhered by toner or contaminated or damaged. The second conductive contact provided on the replaced toner cartridge is in stable contact with the first conductive contact, thereby ensuring the normal operation of the image forming apparatus.

To achieve the above purposes, features, and advantages of embodiments of the present disclosure more obvious and easier to understand, the technical solutions in embodiments of the present disclosure will be clearly and completely described below in conjunction with the drawings in embodiments of the present disclosure. Obviously, the described embodiments are only some of the embodiments of the present disclosure, not all the embodiments. Based on embodiments of the present disclosure, all other embodiments obtained by those persons of ordinary skill in the art without any creative work shall fall within the scope of protection of the present disclosure.

Embodiment I

In order to better describe embodiments of the present disclosure, the coordinate system in the drawings is first described, in which the X-axis is defined as a first direction. The first direction can be a length direction of the main body of the image forming apparatus 200, or can also be regarded as the left-right direction. The Y-axis direction is defined as a second direction, and the second direction can be a width direction of the main body of the image forming apparatus 200, or can also be regarded as the front-back direction. The Z-axis direction is defined as a third direction, and the third direction can be a height direction of the main body of the image forming apparatus 200, or can also be regarded as the up-down direction.

Figure 2:
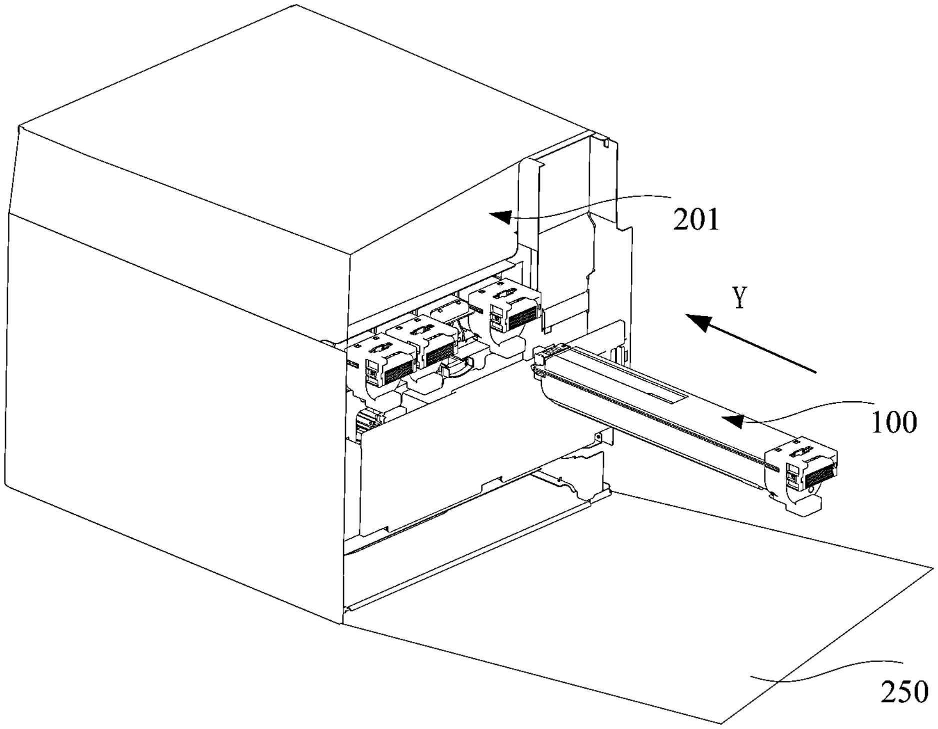
FIG. 2 illustrates a schematic diagram of the first type of toner cartridge being inserted and installed into the main body according to various embodiments of the present disclosure.

As shown in FIG. 1 and FIG. 2, the image forming apparatus provided by embodiments of the present disclosure includes a main body 200 as well as a cartridge assembly and imaging assembly 240 installed in the main body 200. The main body 200 includes an installation cavity 201. Along the second direction, the front end of the installation cavity 201 has an insertion opening to facilitate installation of the cartridge assembly and the imaging assembly 240 into the installation cavity 201.

Specifically, the main body of the image forming apparatus 200 is in a rectangular shape, and is provided with an installation cavity 201. The installation cavity is rectangular or in other irregular shapes. Along the second direction, the front end of the installation cavity 201 has an insertion opening for the inserting of the cartridge assembly. An openable front cover 250 is provided at the edge of the insertion opening. When the front cover 250 is in a closed state, it can seal the insertion opening to seal the installation cavity 201.

In embodiments of the present disclosure, the cartridge assembly can include at least one cartridge, and the cartridge assembly can be inserted into the installation cavity 201, that is, the cartridge assembly can be detachably installed into the main body 200. Furthermore, the image forming apparatus can be equipped with at least one cartridge. The cartridge can be a toner cartridge 100 containing toner for printing.

Along the third direction, the cartridge assembly can be disposed above the imaging assembly 240. The cartridge assembly includes four toner cartridges 100 arranged sequentially along the first direction. Each cartridge can contain toners of different colors. In this embodiment, there is no restrictions. When the toner cartridge 100 is installed into the installation cavity 201 and positioned, the toner cartridge 100 can provide toner to the imaging assembly 240. The second conductive contact of the toner cartridge 100 contacts the first conductive contact of the main body of the image forming apparatus 200 and electrically connected.

However, when the toner in the toner cartridge is exhausted, the toner cartridge needs to be replaced. During the replacement process, the first conductive contact is exposed, and the toner is easy to adhere to the surface of the first conductive contact. Thus, the first conductive contact is contaminated or damaged. After the toner cartridge is replaced, electrical connection between the second conductive contact on the new toner cartridge and the first conductive contact is abnormal, affecting the normal operation of the image forming apparatus.

Figure 3:
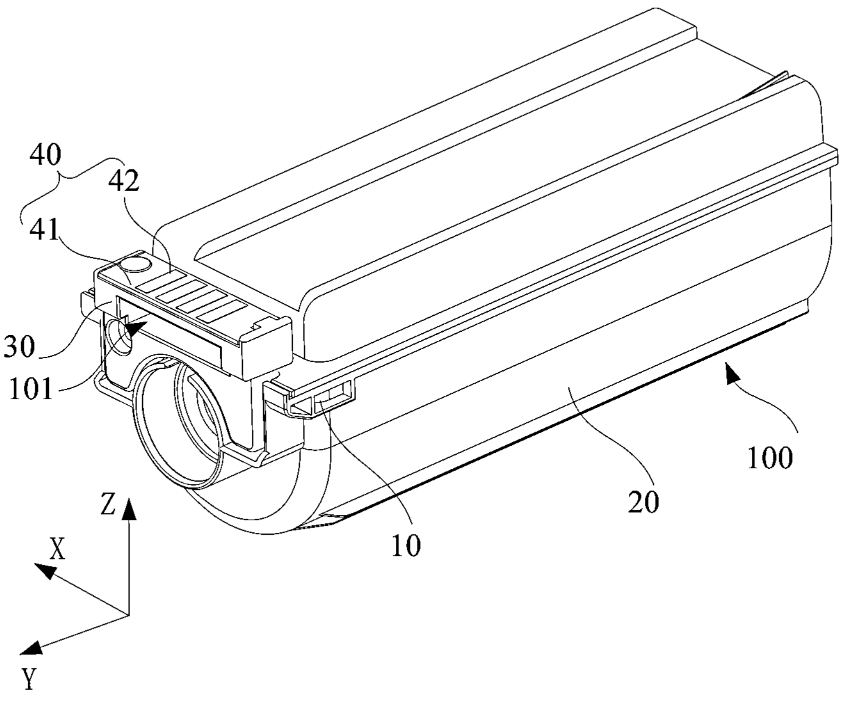
FIG. 3 illustrates a schematic structural diagram of the toner cartridge according to various embodiments of the present disclosure.
Figure 4:
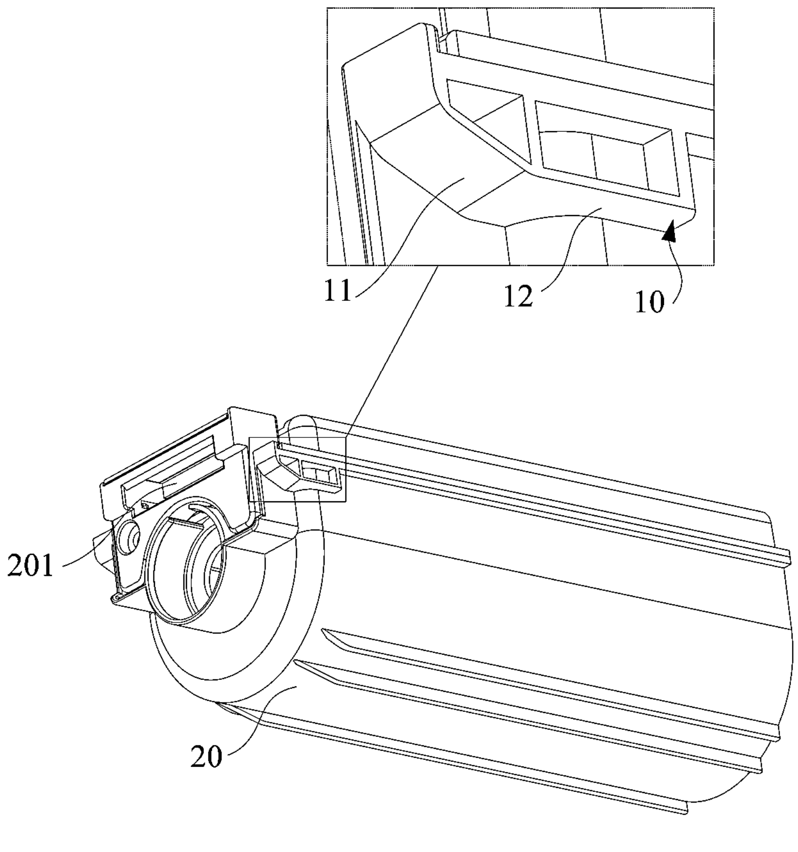
FIG. 4 illustrates a schematic structural diagram of the pressing element in FIG. 3.

To address this, as shown in FIG. 3 and FIG. 4, embodiments of the present disclosure provide an adapter that can be installed on the toner cartridge 100. For example, the adapter can be detachably installed on a housing 20 of the toner cartridge 100, or the adapter and the housing 20 are integrally formed, which is not limited in embodiments of the present disclosure.

Specifically, along the second direction (the direction in which the toner cartridge 100 is inserted into the installation cavity 201 of the main body 200), the housing 20 includes a first end and a second end that is opposite to the first end. During the insertion process of the toner cartridge 100, the first end of housing 20 is closer to the main body 200, that is, the first end of the housing 20 enters the installation cavity 201 earlier than the second end.

The adapter includes a pressing element 10, which is disposed at the first end of the housing 20. The pressing element 10 is configured to, during the insertion process of the toner cartridge 100, act the insertion force from the toner cartridge 100 along the second direction on the protective structure of the main body 200, changing the position of the protective structure in the third direction.

For example, when the protective structure is in the first position, it can protect the first conductive contact. When the pressing element 10 acts on the protective structure and puts the protective structure in the second position, the protective structure can release the protection of the first conductive contact. Thus, the first conductive contact is exposed and electrically connected with the second conductive contact 42.

Figure 5:
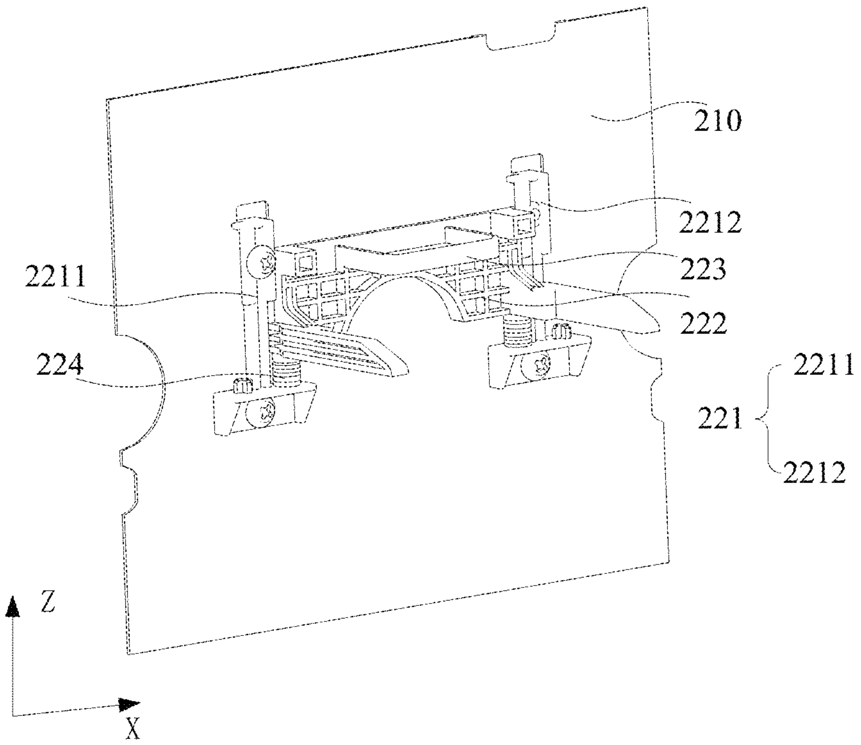
FIG. 5 illustrates a schematic diagram of the connection between the protective part and the rear frame according to various embodiments of the present disclosure.
Figure 6:
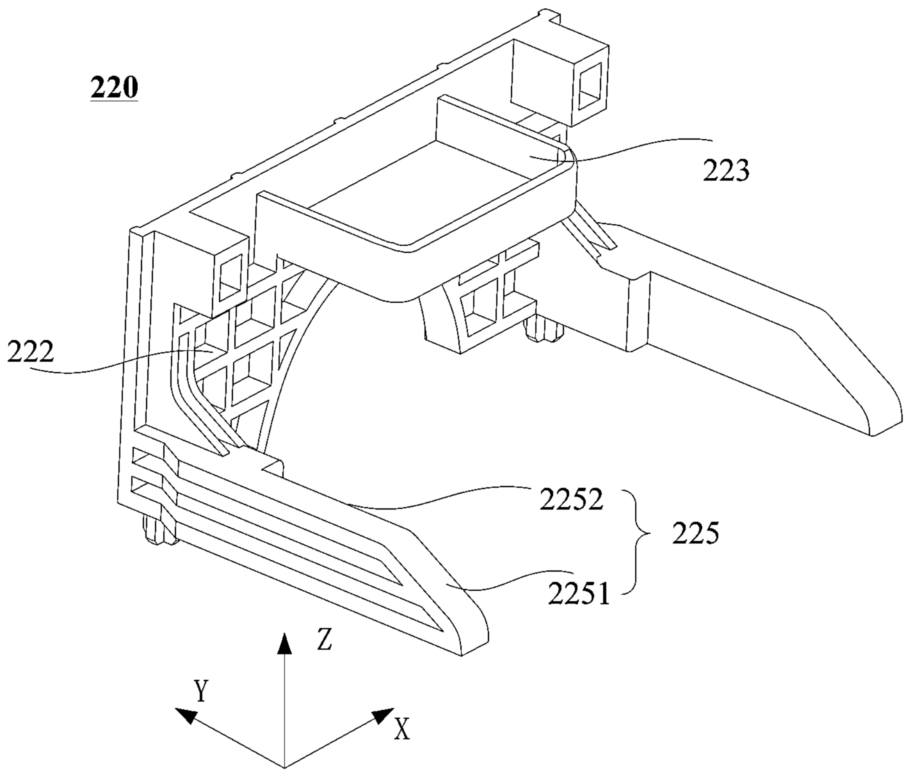
FIG. 6 illustrates a schematic diagram of the arrangement of the protective element on the bearing plate according to various embodiments of the present disclosure.
Figure 7:
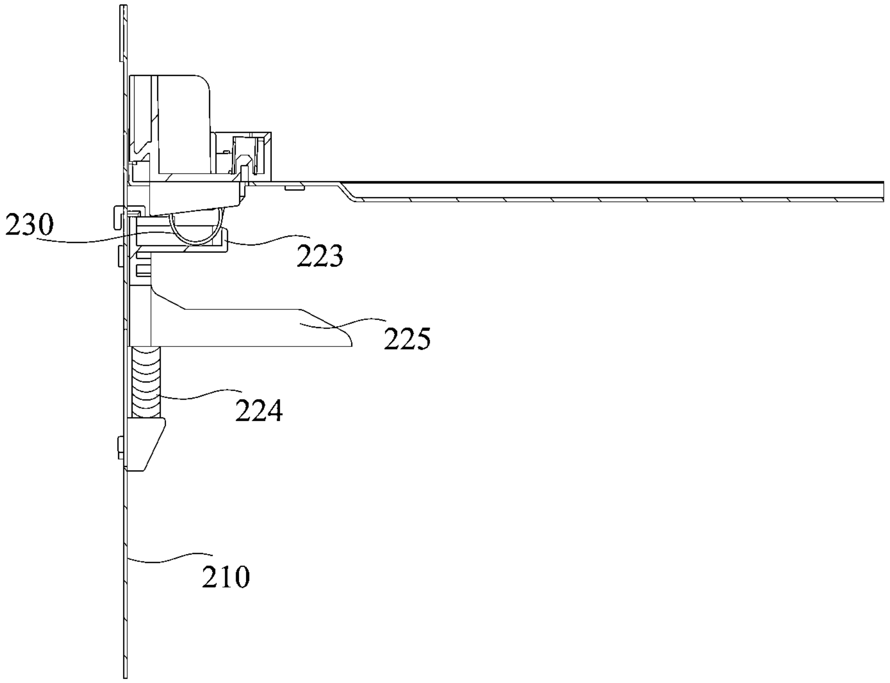
FIG. 7 illustrates a schematic diagram of the protective element in the first position according to various embodiments of the present disclosure.

As shown in FIG. 5 to FIG. 7, the main body of the image forming apparatus 200 provided by embodiments of the present disclosure includes the protective structure 220 and the first conductive contact 230. A rear frame 210 is provided in the installation cavity 201, and the protective structure 220 is provided on the rear frame 210. The protective structure 220 is cooperatively arranged with the pressing element 10 to receive a force from the pressing element 10. Under the force, the protective structure 220 changes its position in the third direction.

The protective structure 220 includes a protective element 223. For example, the protective element 223 can be a protective cover. The first conductive contact 230 is configured to be an elastic contact structure. A part of the first conductive contact 230 is electrically connected to the main body 200. A part of the first conductive contact 230 is exposed in the installation cavity 201. When the cavity 201 is inserted into the toner cartridge 100 and is installed in place, the first conductive contact 230 can contact and be electrically connected to the second conductive contact 42. The installation in place in the present disclosure is interpreted as the toner cartridge 100 is installed into the main body of the image forming apparatus 200 and can perform image forming operations, such as normal printing and normal toner supply.

Correspondingly, the toner cartridge 100 not only includes the housing 20 and the second conductive contact 42, but also an accommodation part 101. The accommodation part 101 is configured to, when the toner cartridge 100 is inserted into the main body 200 along the second direction, form a shelter space. Thus, the protective element 223 can be inserted into the shelter space to avoid interference between the protective element 223 and the housing 20. This ensures that after the toner cartridge 100 is installed in place, the first conductive contact 230 and the second conductive contact 42 are oppositely arranged along the third direction, and the two can be electrically connected.

Figure 8:
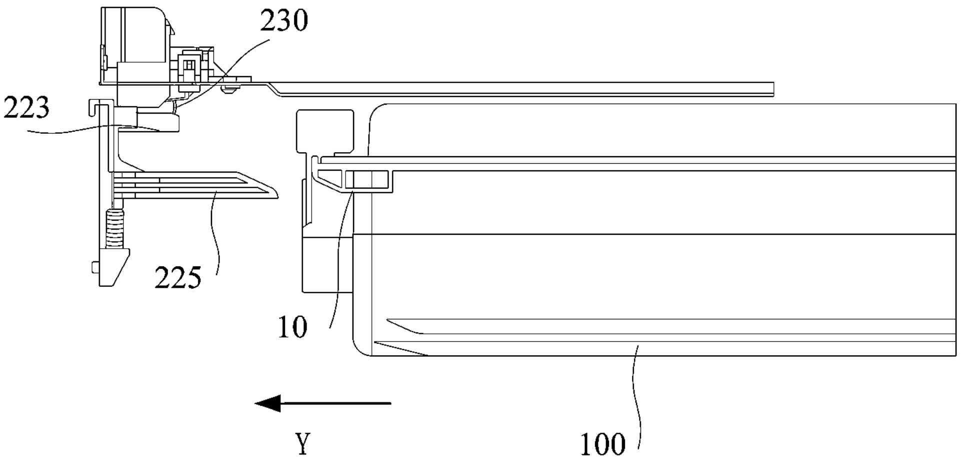
FIG. 8 illustrates a schematic diagram of the toner cartridge being pre-inserted into the main body according to various embodiments of the present disclosure.
Figure 9:
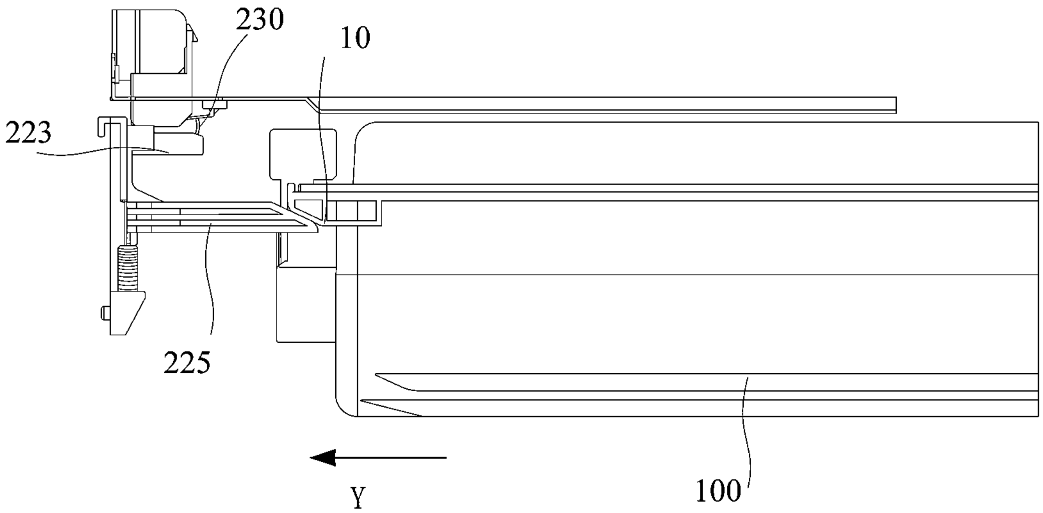
FIG. 9 to FIG. 11 illustrate schematic diagrams of the process of inserting the toner cartridge into the main body according to various embodiments of the present disclosure.
Figure 10:
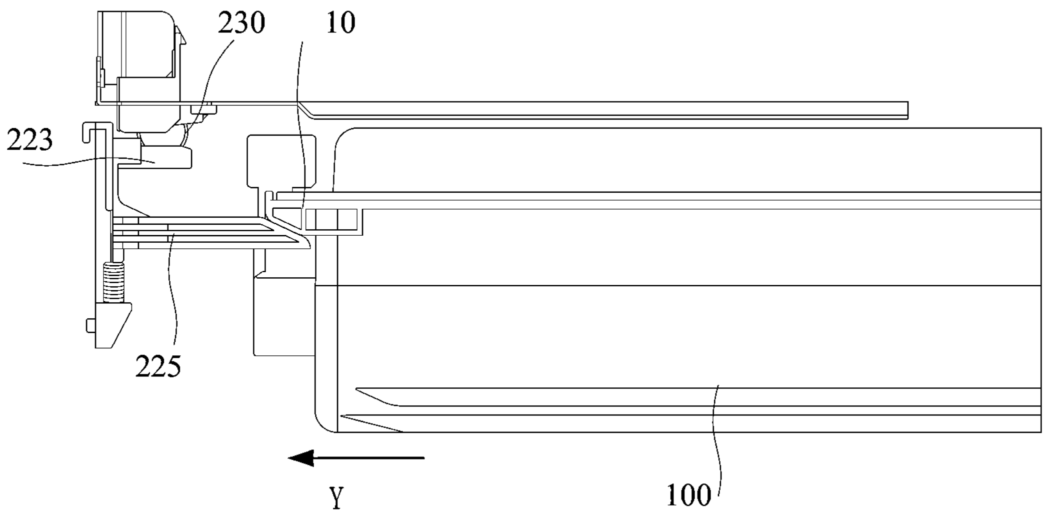
Figure 11:
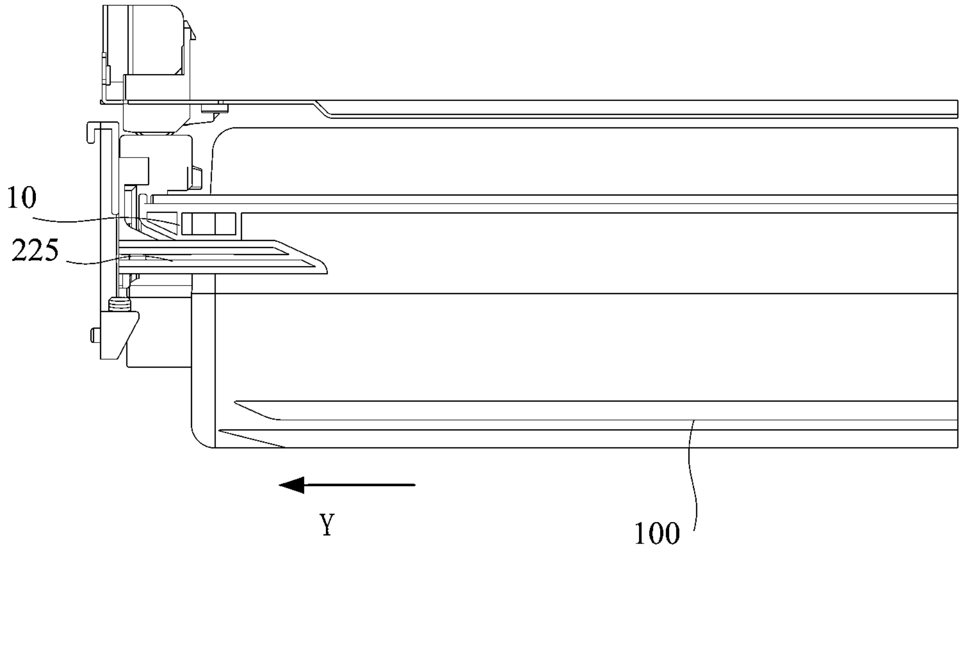

As shown in FIG. 7 and FIG. 8, in one embodiment, along the third direction, the protective element 223 is disposed below the first conductive contact 230 and protects the first conductive contact 230. When the toner cartridge 100 is not inserted into the installation cavity 201, the protective element 223 is in the first position (initial position), and the protective element 223 is arranged around the first conductive contact 230 to protect the first conductive contact 230. This prevents toner from adhering to the first conductive contact 230 during replacing the toner cartridge 100, or prevents the first conductive contact 230 from being contaminated or damaged.

As shown in FIG. 9 to FIG. 12, when the toner cartridge 100 with the adapter is inserted into the installation cavity 201 of the main body 200, the pressing element 10 cooperates with the protective structure 220 so that the protective element 223 is inserted into the installation cavity 201 of the main body 200 and the main body 200 is installed in place. At this time, the protective element 223 is accommodated in the accommodation part 101. The protective element 223 moves to the second position along the third direction and is separated from the first conductive contact 230, so that the first conductive contact 230 exposed, that is, the protective element 223 releases the protection of the first conductive contact 230. Then the second conductive contact 42 moves to a position opposite to the first conductive contact 230, and the two are electrically connected.

The adapter provided by embodiments of the present disclosure can cooperate with the protective structure 220 during the process of replacing the toner cartridge 100. Thus, the protective element 223 protects the first conductive contact 230 to avoid the toner adhering to the first conductive contact 230 or the first conductive contact 230 being contaminated or damaged. This ensures that the second conductive contact 42 of the replaced toner cartridge 100 is in stable contact with the first conductive contact 230, thereby ensuring the normal operation of the image forming apparatus.

The adapter provided by embodiments of the present disclosure can be detachably installed on the housing 20 of the toner cartridge 100. The adapter includes an installation structure, configured to install the pressing element 10 to the housing 20.

Specifically, the installation structure includes an installation part, which is used to install the pressing element 10 on the housing 20 of the toner cartridge 100. For example, the installation structure can be a snap-on assembly, and the pressing element 10 is installed on the housing 20 through the snap-on assembly. The installation part can be configured as a buckle and a slot that cooperates with the buckle. The buckle is provided on the housing 20 and the slot is provided on the pressing element 10. The pressing element 10 is fastened to the housing 20 through the slot to be detachably installed on the housing 20.

Continuing to refer to FIG. 4, it should be noted that in embodiments of the present disclosure, one pressing element 10 is provided on each of both sides of the housing 20 along the second direction, and the two pressing elements 10 can be symmetrically arranged on the housing 20. With this arrangement, when the toner cartridge 100 is inserted into the installation cavity 201 of the main body 200, the protective structure 220 can be evenly stressed, ensuring that it can move from the first position to the second position.

The pressing element 10 includes a first guide slope 11, and the first guide slope 11 is configured to tilt upward along the second direction (the insertion direction of the toner cartridge 100). During the process of inserting the toner cartridge 100 into the installation cavity 201, the first guide slope 11 contacts the protective structure 220.

As shown in FIG. 6, in one embodiment, the protective structure 220 includes a guide rail 225 and a first elastic element 224. A length direction of the guide rail 225 is consistent with the second direction, and it slides up and down with respective to the rear frame 210 along the third direction. The protective element 223 can move together with the guide rail 225. The expansion and contraction direction of the first elastic element 224 is consistent with the third direction. One end of the first elastic element 224 is connected to the guide rail 225 and provides the guide rail 225 with elastic force or restoring force along the third direction.

Along the second direction, an end of the guide rail 225 away from the rear frame 210 is provided with a second guide slope 2251 that cooperates with the first guide slope 11. The second guide slope 2251 extends obliquely downward along the second direction. As the toner cartridge 100 is inserted into the installation cavity 201, the first guide slope 11 and the second guide slope 2251 are adhered together. The insertion force from the second direction of the toner cartridge 100, under the action of the first guide slope 11, is partially converted into a component force along the third direction. The component force in the third direction causes the guide rail 225 to move downward along the third direction, so that the protective element 223 can move from the first position to the second position.

Furthermore, in order to ensure that during the insertion process of the toner cartridge 100, the first guide slope 11 contacts the protective structure 220 before other parts of the housing 20. In embodiments of the present disclosure, the pressing element 10 is provided at the first end of the housing 20, and the first guide slope 11 protrudes from an end surface of the first end of the housing 20 along the second direction, that is, along the insertion direction of the toner cartridge 100. Compared with the end surface of the first end of the toner cartridge 100, the first guide slope 11 is closer to one side of the main body 200 to ensure that the first guide slope 11 contacts the second guide slope 2251 before the end surface of the first end. Such arrangement can ensure the reliability of the first guide slope 11 and the second guide slope 2251.

In another embodiment, the pressing element 10 not only includes a first guide slope 11 but also a first horizontal bearing surface 12, and the first horizontal bearing surface 12 in contact with the first guide slope 11. Along the second direction, the first horizontal bearing surface 12 is located on a side of the first guide slope 11 away from the main body 200. That is, during the process of inserting the toner cartridge 100 into the installation cavity 201, the first guide slope 11 contacts the second guide slope 2251 before the first horizontal bearing surface 12.

Correspondingly, the guide rail 225 also includes a second horizontal bearing surface 2252, and the second horizontal bearing surface 2252 is in contact with the second guide slope 2251. The second horizontal bearing surface 2252 is located on a side of the second guide slope 2251 away from the housing 20, and the second horizontal bearing surface 2252 is configured to be adhered to the first horizontal bearing surface 12.

In embodiments of the present disclosure, when the toner cartridge 100 is inserted into the accommodation cavity of the main body 200 and the first guide slope 11 is adhered to the second guide slope 2251, the first guide slope 11 can exert pressure on the first elastic element 224. Thus, the guide rail 225 moves downward along the third direction, thereby moving the protective element 223 from the first position to the second position.

As the toner cartridge 100 continues to be inserted along the second direction, when the first horizontal bearing surface 12 is adhered to the second horizontal bearing surface 2252, the protective structure 220 and the toner cartridge 100 can be limited in the third direction. Thus, the protection element 223 is in the second position. With the toner cartridge 100 installed in place, the protective element 223 is accommodated in the accommodation part 101 of the housing 20, and the first conductive contact 230 is electrically connected to the second conductive contact 42.

Figure 13:
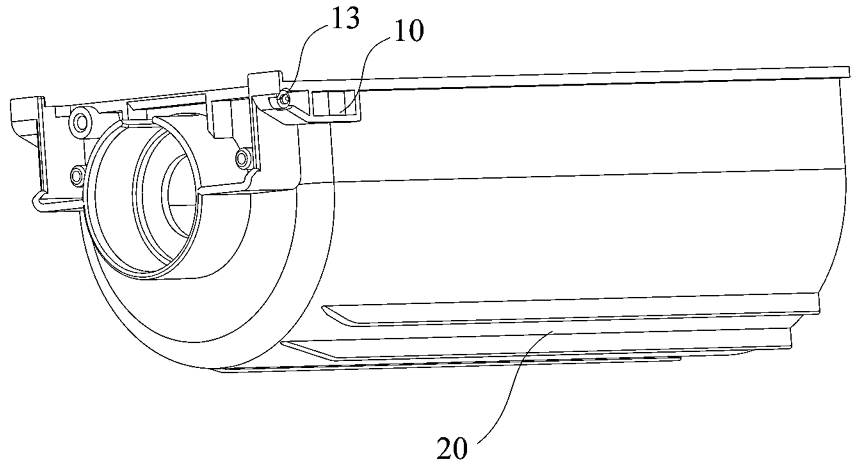
FIG. 13 illustrates a schematic diagram of the arrangement of the first roller on the pressing element according to various embodiments of the present disclosure.

As shown in FIG. 13, in order to reduce the friction force when the first guide slope 11 is adhered to the second guide slope 2251, the pressing element 10 provided in embodiments of the present disclosure also includes a first roller 13. The first roller 13 is rotatably disposed at the first guide slope 11, and at least part of an outer peripheral surface of the first roller 13 protrudes from the first guide slope 11 to ensure that when the first guide slope 11 is adhered to the second guide slope 2251, the second guide slope 2251 can contact the outer peripheral surface of the first roller 13, thereby reducing the friction force when the first guide slope 11 and the second guide slope 2251 contact.

Figure 14:
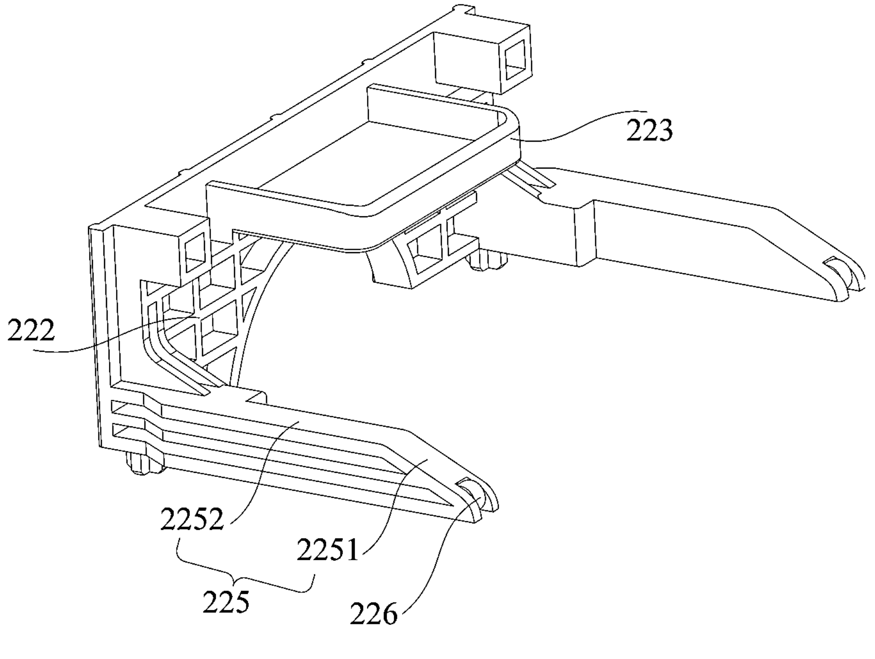
FIG. 14 illustrates a schematic diagram of the arrangement of the second roller on the guide rail according to various embodiments of the present disclosure.

As shown in FIG. 14, in order to reduce the friction force when the first guide slope 11 is adhered to the second guide slope 2251, the second guide slope 2251 can be provided with a second roller 226. The second roller 226 is rotatably disposed on the second guide slope 2251. At least part of an outer peripheral surface of the second roller 226 protrudes from the second guide slope 2251 to ensure that when the first guide slope 11 is adhered to the second guide slope 2251, the first guide slope 11 can contact the outer peripheral surface of the second roller 226, thereby reducing the friction force when the first guide slope 11 and the second guide slope 2251 contact.

Alternatively, in order to reduce the friction force when the first guide slope 11 is adhered to second guide slope 2251, the first guide slope 11 is provided with a first roller 13. At the same time, the second guide slope 2251 is provided with a second roller 226. Embodiments of the present disclosure do not limit this.

Figure 15:
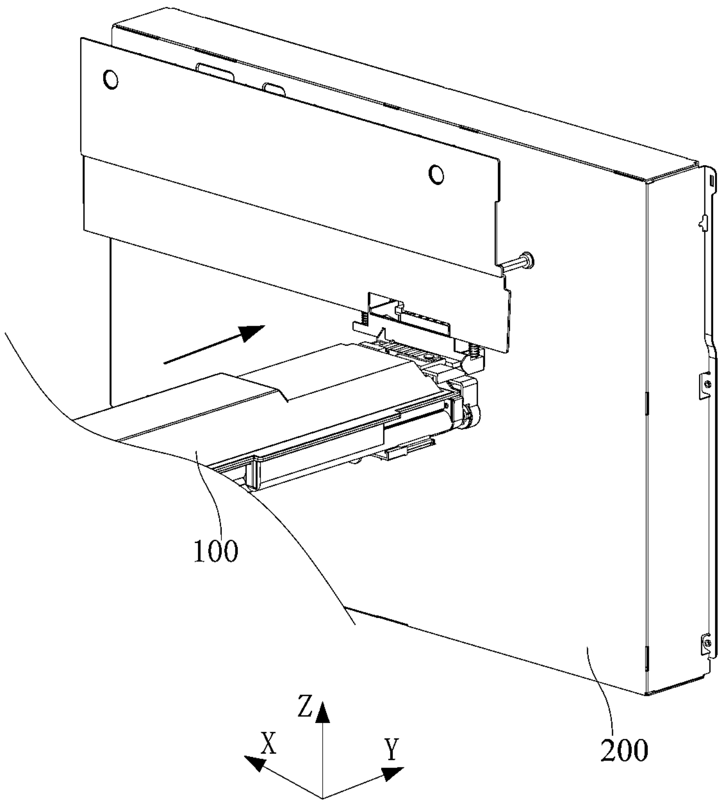
FIG. 15 illustrates a first schematic diagram of the second type of toner cartridge being inserted into the main body according to various embodiments of the present disclosure.
Figure 16:
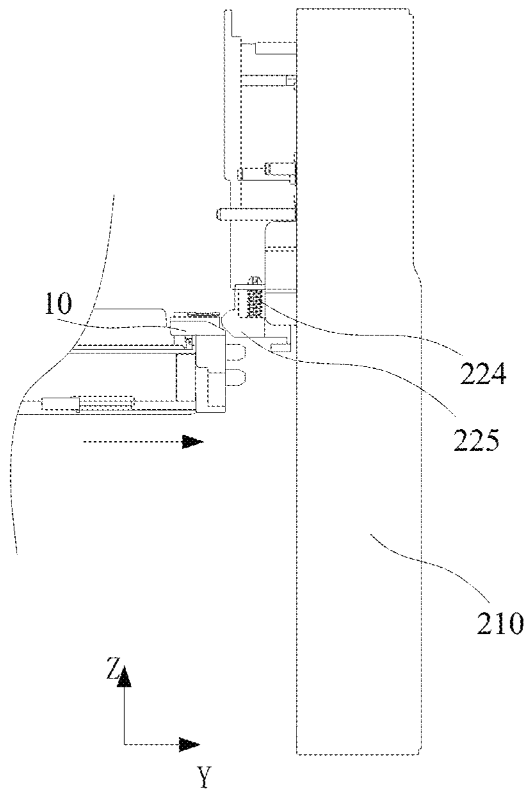
FIG. 16 illustrates a second schematic diagram of the second type of toner cartridge being inserted into the main body according to various embodiments of the present disclosure.
Figure 17:
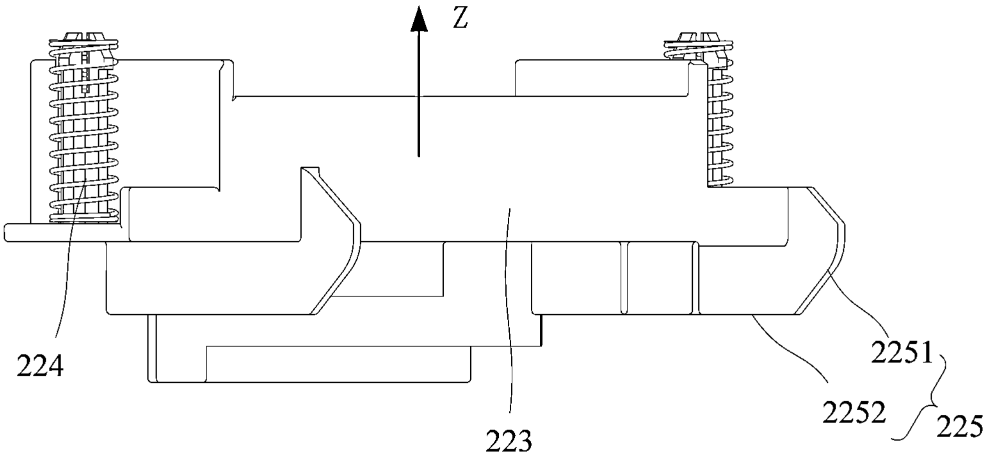
FIG. 17 illustrates a schematic structural diagram of the protective structure in FIG. 15 according to various embodiments of the present disclosure.

As shown in FIG. 15 to FIG. 17, in another embodiment, when the pressing element 10 provided by embodiments of the present disclosure contacts the protective structure 220, the protective element 223 moves upward along the third direction and exposes the first conductive contact 230. To achieve the purpose of releasing the protection of the first conductive contact 230, the second conductive contact 42 of the toner cartridge 100 and the first conductive contact 230 can be electrically connected.

Specifically, along the second direction (the insertion direction of the toner cartridge 100), the first guide slope 11 of the pressing element 10 extends obliquely downward. Correspondingly, the protective structure 220 includes a second guide slope 2251 that cooperates with the first guide slope 11.

For example, the protective structure 220 also includes a guide rail 225 and a protective element 223. The protective element 223 is linked with the guide rail 225 and can move together with the guide rail 225. The first end of the guide rail 225 slides up and down with respect to the rear frame 210, and the second end of the guide rail 225 is used to contact the pressing element 10. The second guide slope 2251 is located at the second end of the guide rail 225 and extends obliquely upward along the second direction. The second guide slope 2251 can be adhered to the first guide slope 11.

It should be noted that in this embodiment, the pressing element 10 also includes a first horizontal bearing surface 12 connected with the first guide slope 11. Correspondingly, the guide rail 225 is also provided with a second horizontal bearing surface 2252 connected with the second guide slope 2251.

Figure 18:
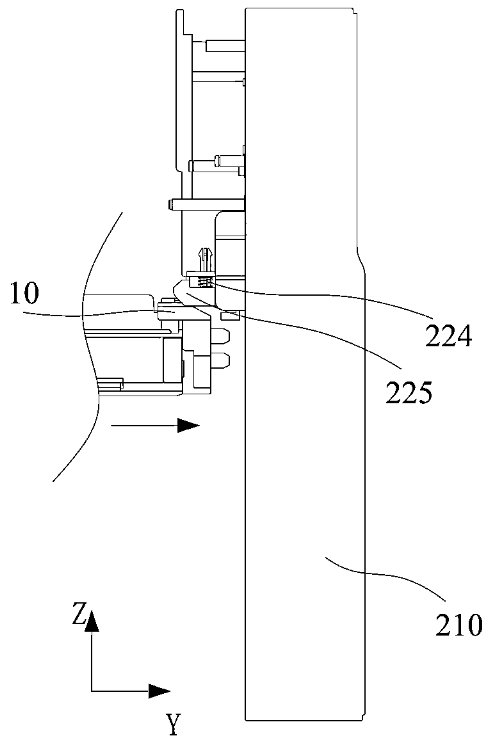
FIG. 18 and FIG. 19 illustrate schematic diagrams of the process of inserting the toner cartridge into the main body according to various embodiments of the present disclosure.
Figure 19:
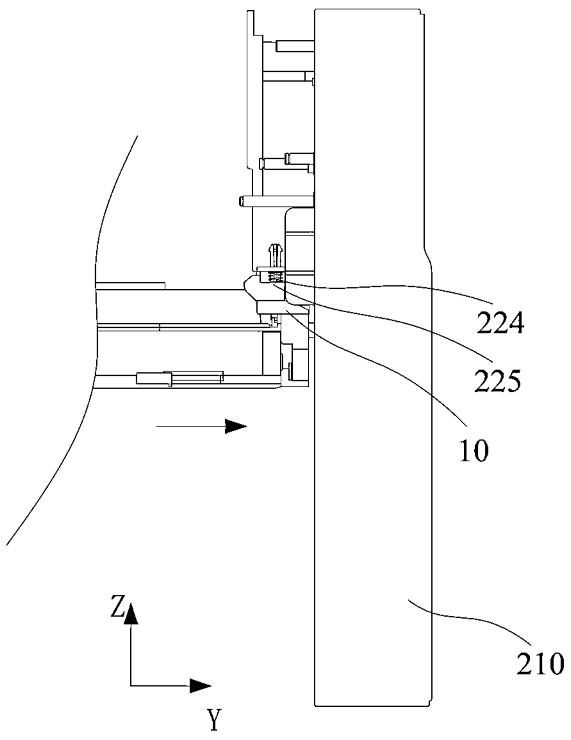

As shown in FIG. 18 and FIG. 19, when the toner cartridge 100 is inserted into the accommodation cavity of the main body 200 as well as the first guide slope 11 is adhered to the second guide slope 2251, the first guide slope 11 can exert pressure on the first elastic element 224 to move the guide rail 225 upward along the third direction, thereby moving the protective element 223 from the first position to the second position. The protective element 223 moves to above the first conductive contact 230 and exposes the first conductive contact 230, thereby releasing the protection of the first conductive contact 230.

As the toner cartridge 100 continues to be inserted along the second direction, when the first horizontal bearing surface 12 is adhered to the second horizontal bearing surface 2252, the protective structure 220 and the toner cartridge 100 can be limited in the third direction at this time. This makes the protective element 223 in the second position. With the toner cartridge 100 installed in place, the first conductive contact 230 is electrically connected with the second conductive contact 42.

Embodiment II

Referring to FIG. 3 and FIG. 4, a toner cartridge 100 provided by embodiments of the present disclosure includes a housing 20. The housing 20 includes a cavity and a toner outlet connected to the cavity. The cavity is used to accommodate toner. Toner for printing can be provided to the imaging assembly 240 through the toner outlet.

The entire housing 20 is in a shape of a long tube. Along the second direction, the housing 20 includes an opposite first end and a second end. The housing 20 includes an installation area located at the first end of the housing 20.

The installation area is provided with an installation structure, and the installation structure is used to install the adapter.

For example, the adapter includes a pressing element 10. The installation structure can be a snap-on assembly. The pressing element 10 is installed on the housing 20 through the snap-on assembly. The snap-on assembly includes a buckle and a slot that cooperates with the buckle. The buckle is provided on the housing 20, and the slot is provided on the pressing element 10. The pressing element 10 is connected to the buckle of the housing 20 through the slot, so that the pressing element 10 can be detachably installed on the housing 20.

The toner cartridge 100 provided by embodiments of the present disclosure is detachably installed on the main body of the image forming apparatus 200. For example, the main body 200 is provided with an installation cavity 201, and the toner cartridge 100 can be inserted into the installation cavity 201. The housing 20 is provided with an accommodation part 101, a second conductive contact 42, and the pressing element 10. As for the solution of the cooperation between the accommodation part 101, the pressing element 10, and the protective structure 220 of the main body 200, the details will not be described in detail here. Please refer to the Embodiment I.

The toner cartridge 100 provided by embodiments of the present disclosure not only includes an adapter on the housing 20, but also includes a storage apparatus 40 and a bracket 30 for mounting the storage apparatus 40. Specifically, the storage apparatus 40 can be a chip, which is used to store information such as toner of the toner cartridge 100, and the storage apparatus 40 is used to electrically connect with the first conductive contact 230 of the main body 200 to establish a communication between the toner cartridge 100 and the image forming apparatus.

The storage apparatus 40 includes a substrate 41 and a plurality of communication terminals provided on the substrate 41. The plurality of communication terminals is configured as second conductive contacts 42. The bracket 30 is used to carry the storage apparatus 40. For example, the bracket 30 is provided on an end surface of the first end of the housing 20. Along the third direction, the bracket 30 is located at an upper position on the end surface of the first end, and the substrate 41 is installed on the bracket 30. Thus, the storage apparatus 40 is installed on the housing 20.

Further, the bracket 30, the housing 20, and the substrate 41 surround an accommodation part 101. The accommodation part 101 is provided with an opening in the second direction. The opening cooperates with the protective element 223. During the process of inserting the toner cartridge 100 into the installation cavity 201, the protective element 223 can be accommodated in the accommodation part 101 through the opening to avoid interference from the protective element 223 and the housing 20. At the same time, the first conductive contact 230 and the second conductive contact 42 are also oppositely arranged.

It should be noted that the bracket 30 itself is provided with an accommodation part 101. For example, the bracket 30 is configured as an installation cartridge with an accommodation space inside the cartridge. The substrate 41 can be disposed on the top of the installation cartridge or inside the installation cartridge, which is not limited in embodiments of the present disclosure. An opening is provided on one side wall of the cartridge, and the opening cooperates with the protective element 223. When the toner cartridge 100 is inserted into the installation cavity 201, the protective element 223 can be accommodated into the accommodation part 101 through the opening.

Figure 12:
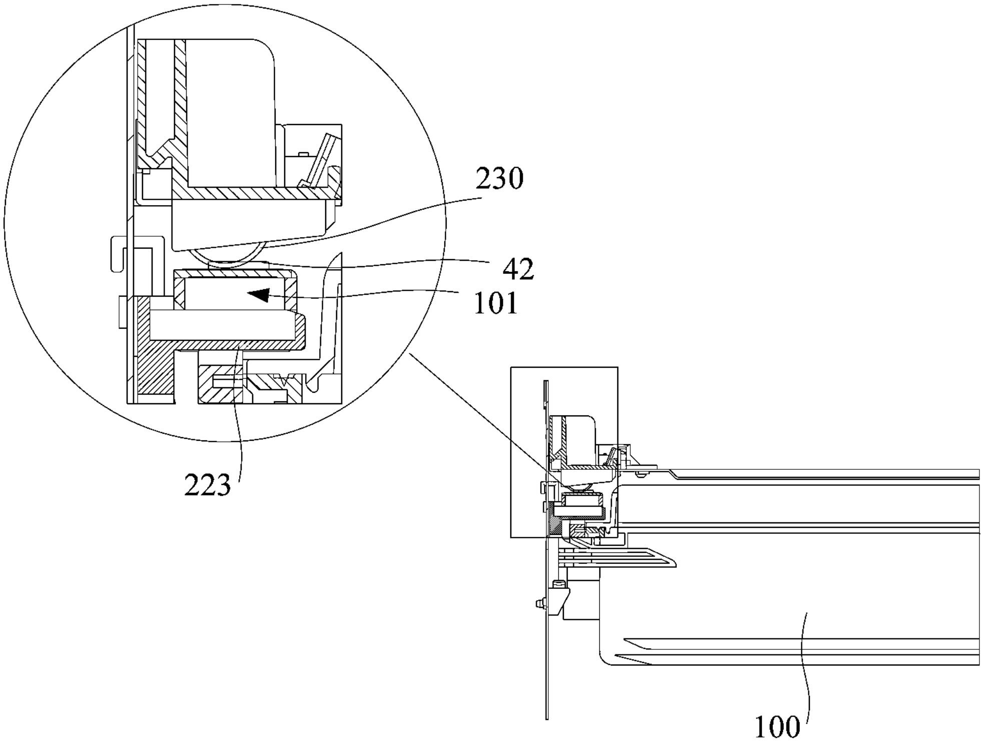
FIG. 12 illustrates a schematic diagram of the state when the toner cartridge is installed in place according to various embodiments of the present disclosure.

Referring to FIG. 7 and FIG. 12, in one embodiment, the substrate 41 is disposed on the top of the bracket 30, and the second conductive contact 42 is disposed on a side of the substrate 41 away from the bracket 30, that is, the second conductive contact 42 is disposed on a side away from the accommodation part 101. Correspondingly, the second conductive contact 42 can be opposite to the first conductive contact 230. After the toner cartridge 100 is inserted into the main body 200 and installed in place and the protective element 223 is in the second position and accommodated in the accommodation part 101, the second conductive contact 42 is located below the first conductive contact 230, and the two are in contact and electrically connected.

Figure 20:
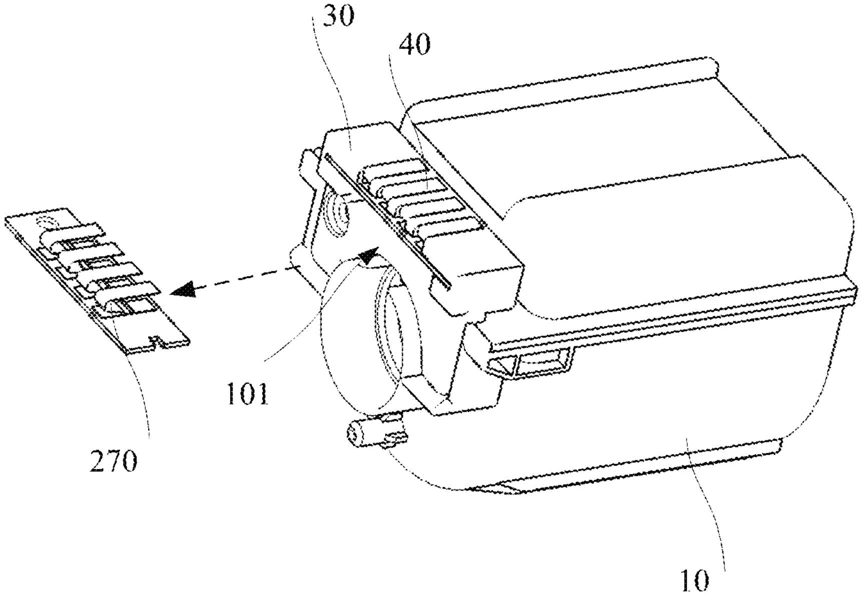
FIG. 20 illustrates a schematic diagram of the cooperation between the conductive sheet and the second conductive contact according to various embodiments of the present disclosure.

As shown in FIG. 20, in another embodiment, the second conductive contact 42 is arranged facing the accommodation part 101, that is, the second conductive contact 42 is in the accommodation part 101. For example, the top of the accommodation part 101 is provided with a through hole connected to its accommodation space, and the second conductive contact 42 is exposed in the through hole. Correspondingly, the first conductive contact 230 is disposed on the protective element 223 and is located on the top surface of the protective element 223.

For example, the first conductive contact 230 is disposed in a groove of the protective element 223. Alternatively, a conductive sheet 270 electrically connected to the first conductive contact 230 is provided on the top surface of the protective element 223. When the protective element 223 is accommodated in the accommodation part 101, the conductive sheet 270 contacts the second conductive contact 42. The conductive sheet 270 can be an elastic conductive sheet 270.

When the toner cartridge 100 is inserted into the main body of the image forming apparatus 200 and installed in place, and the protective element 223 is in the second position and accommodated in the accommodation part 101, the groove is opposite to the first conductive contact 230. The second conductive contact 42 is located below the first conductive contact 230, and the two are in contact and electrically connected.

Figure 21:
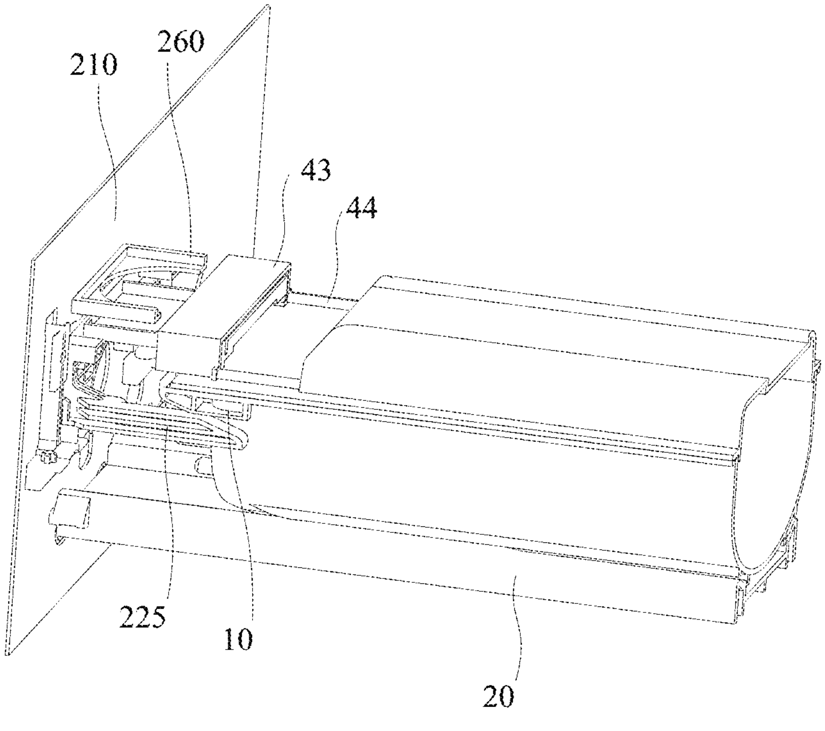
FIG. 21 illustrates a schematic diagram of the cooperation arrangement of the first pushing element and the first protective cover according to various embodiments of the present disclosure.
Figure 22:
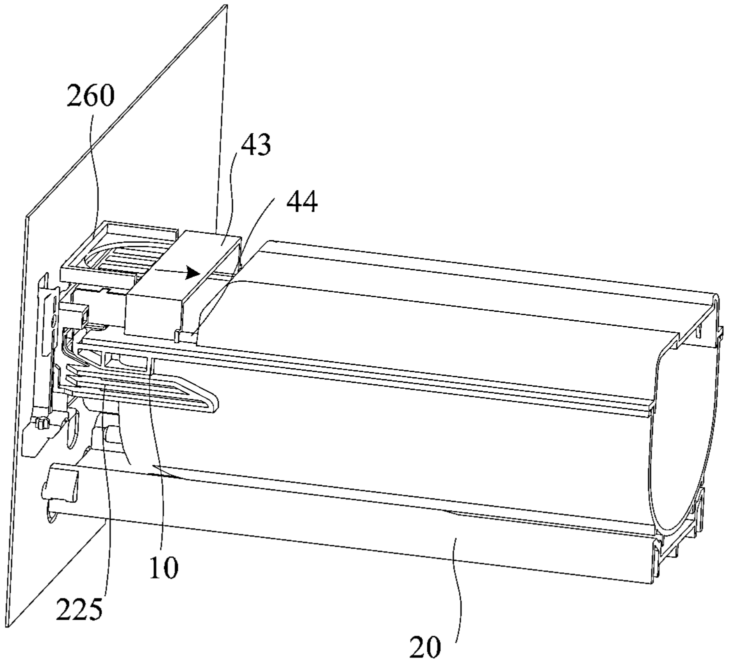
FIG. 22 illustrates a schematic diagram of the first pushing element pushing the first protective cover to move according to various embodiments of the present disclosure.

As shown in FIG. 21 and FIG. 22, embodiments of the present disclosure are to protect the second conductive contact 42 during the insertion process of the toner cartridge 100. The toner cartridge 100 also includes a first protective cover 43. The first protective cover 43 is slidably installed on the bracket 30 along the second direction, and the first protective cover 43 is placed above the second conductive contact 42. In this case, the substrate 41 is disposed on the top of the bracket 30, and the second conductive contact 42 is disposed on a side of the substrate 41 away from the bracket 30.

The first protective cover 43 is configured such that when the cartridge is inserted into the main body 200 and installed in place, and the protective element 223 is in the second position and accommodated in the accommodation part 101, the protective element 223 can push the first protective cover 43 to slide and expose the second conductive contact 42.

For example, the protective element 223 is provided with a first pressing element 260 that cooperates with the first protective cover 43. The first pressing element 260 is located on the sliding path of the first protective cover 43. When the toner cartridge 100 is inserted into the installation cavity 201, the first pressing element 260 can contact the first protective cover 43 and push the first protective cover 43 to move in an opposite direction to the insertion direction, thereby exposing the second conductive contact 42. This makes the second conductive contact 42 located below the first conductive contact 230, and the two are in contact and electrically connected.

In order to further protect the second conductive contact 42 when the toner cartridge 100 is pulled out from the main body 200, a second conductive contact 42 is provided between the first protective cover 43 and the bracket 30 in embodiments of the present disclosure. The expansion and contraction direction of the second elastic element 44 is consistent with the insertion direction of the toner cartridge 100. The second elastic element 44 is located on a side of the first protective cover 43 away from the first pressing element 260, and the second elastic element 44 is configured to provide elastic force to the first protective cover 43.

When the toner cartridge 100 is inserted into the installation cavity 201, the first pressing element 260 contacts the first protective cover 43. The first pressing element 260 is fixed to the main body 200, and under the insertion force of the toner cartridge 100, overcomes the elastic force of the second elastic element 44. The second elastic element 44 starts to be compressed, and the first protective cover 43 slides. When the toner cartridge 100 is inserted into the main body 200 and installed in place, the second elastic element 44 is in a compressed state, and the first protective cover 43 slides to a side of the substrate 41, exposing the second conductive contact 42. This makes the second conductive contact 42 located below the first conductive contact 230, and the two are in contact and electrically connected.

On the contrary, when the toner cartridge 100 is separated from the installation cavity 201, that is, when the protective element 223 is separated from the accommodation part 101, the first pressing element 260 is gradually separated from the first protective cover 43, and the second elastic element 44 is reset. Then the first protective cover 43 moves to above the substrate 41 and covers the second conductive contact 42 to protect the second conductive contact 42.

Figure 23:
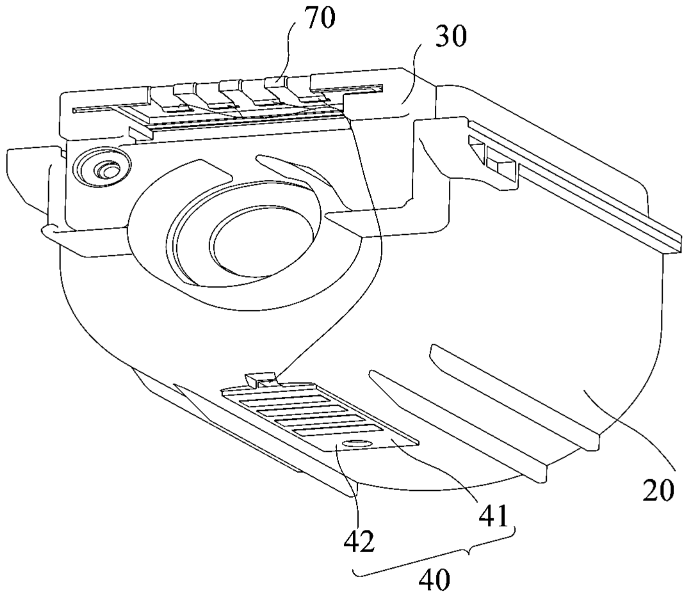
FIG. 23 illustrates a schematic diagram of the connection between the switching component and the storage apparatus according to various embodiments of the present disclosure.

As shown in FIG. 23, in other embodiments, the toner cartridge 100 provided by the embodiments of the present disclosure disposes the chip in other positions of the housing 20. For example, the chip is disposed on the bottom wall of the housing 20 along the third direction. This arrangement can prevent the second conductive contact 42 of the toner cartridge 100 from being scratched or contaminated.

Specifically, the toner cartridge 100 further includes an adapter component 70, which is disposed on the top of the housing 20. The adapter component 70 is connected to the second conductive contact 42 through a signal wire. The adapter component 70 is configured as a plurality of conductive sheets disposed on the top of the housing 20, and the plurality of conductive sheets are respectively disposed corresponding to the plurality of first conductive contacts 230.

Further, the adapter component 70 is configured such that when the toner cartridge 100 is inserted into the main body 200 and installed in place, and the protective element 223 is in the second position and accommodated in the accommodation part 101, each conductive sheet of the adapter component 70 is electrically connected to the plurality of the first conductive contacts 230, respectively.

In some embodiments, the chip is movably disposed on the housing 20. The chip is slidably installed on the housing 20 along the third direction, and the chip is hidden in the housing 20. When the second conductive contact 42 needs to be connected to the first conductive contact 230, the chip can move upward along the third direction and contact the first conductive contact 230.

Figure 24:
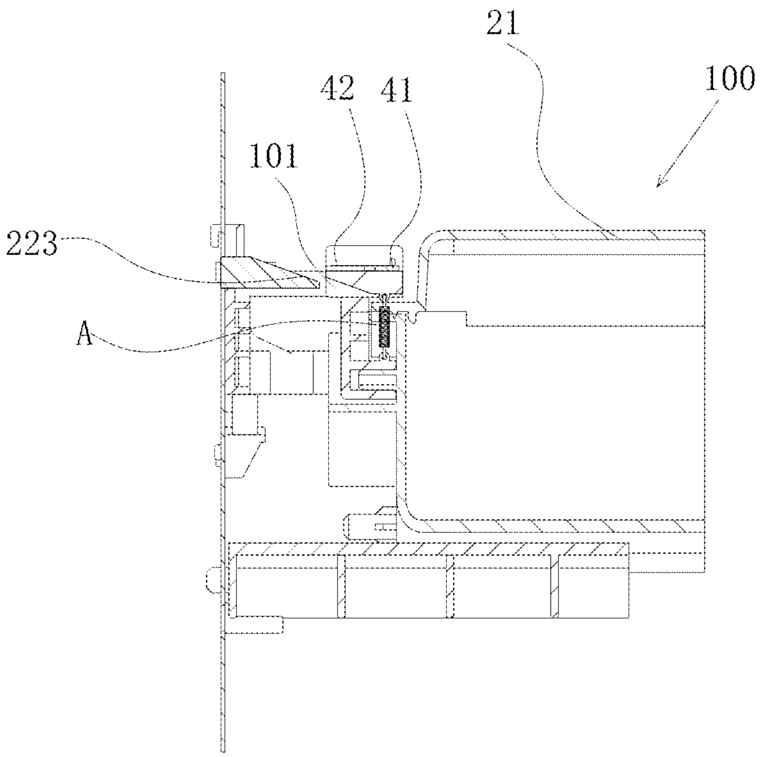
FIG. 24 illustrates a first schematic diagram of the chip according to various embodiments of the present disclosure being able to elastically expand and contract with respect to the toner cartridge.
Figure 25:
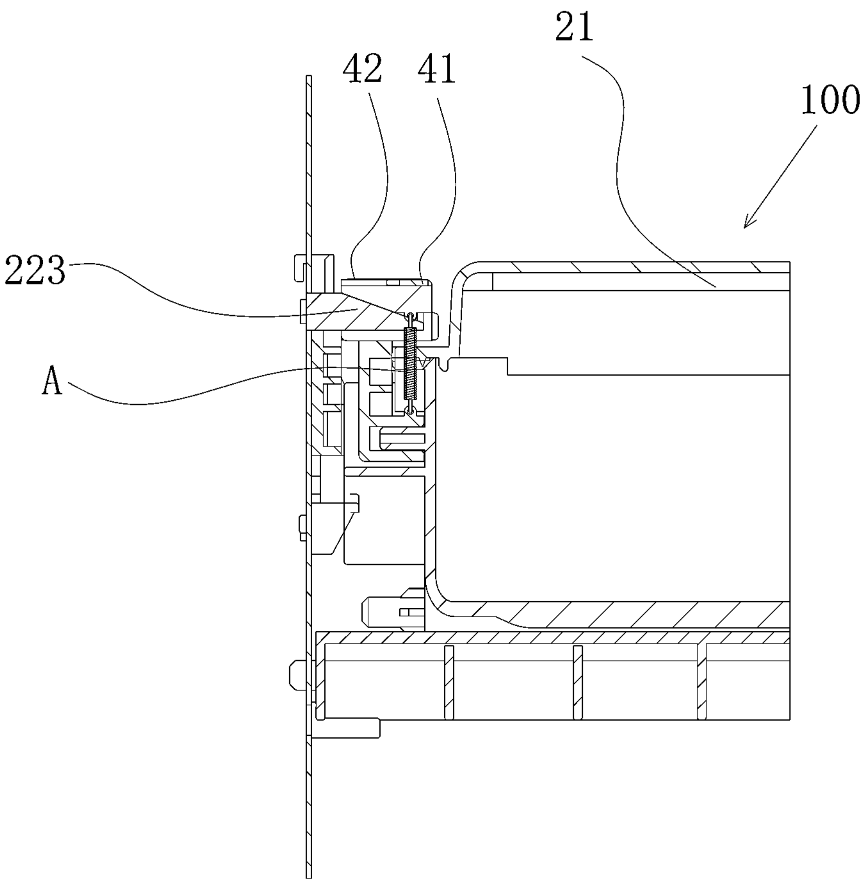
FIG. 25 illustrates a second schematic diagram of the chip according to various embodiments of the present disclosure being able to elastically expand and contract with respect to the toner cartridge.

For example, as shown in FIG. 24 and FIG. 25, an elastic element A is provided under the substrate 41 of the chip, and the elastic element A provides elastic force to the substrate 41. A second conductive contact 42 is provided on a top surface of the substrate 41. In the initial state, the second conductive contact 42 is lower than the top surface of the housing 20. When the toner cartridge 100 is inserted into the main body 200 and installed in place, and the protective element 223 is in the second position and accommodated in the accommodation part 101, the chip can be unlocked. Under the action of the elastic member A, the substrate 41 moves upward and is electrically connected to the first conductive contact 230.

Embodiment III

Figure 26:
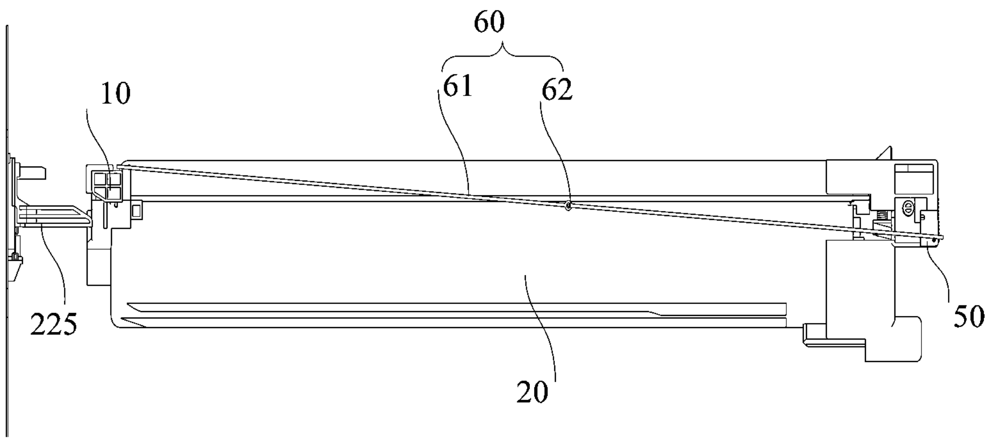
FIG. 26 illustrates a first schematic diagram of the linkage between the linkage structure, the pressing element, and the handle according to various embodiments of the present disclosure.
Figure 27:
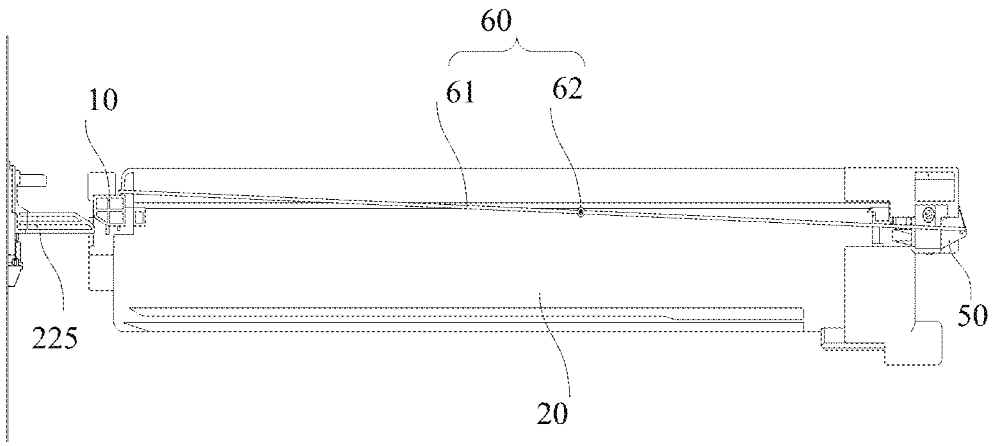
FIG. 27 illustrates a second schematic diagram of the linkage between the linkage structure, the pressing element, and the handle according to various embodiments of the present disclosure.

As shown in FIG. 26 and FIG. 27, embodiments of the present disclosure provide a toner cartridge 100. A pressing element 10 is provided in a safe area of the housing 20, and the pressing element 10 slides in a third direction with respect to the housing 20. When the pressing element 10 is in contact with the protective structure 220, the pressing element 10 can press the protective structure 220 along the third direction under the action of external force, so that the protective element 223 moves from the first position to the second position.

Specifically, the toner cartridge 100 also includes a linkage structure 60. The linkage structure 60 includes a connecting rod 61 and a rotating shaft 62. The rotating shaft 62 is disposed in the middle of the connecting rod 61, and the connecting rod 61 is rotationally connected to a side wall of the housing 20 through the rotating shaft 62. The housing 20 includes an opposite first end and a second end, where the pressing element 10 is slidably disposed on a side wall of the first end of the housing 20, and the top of the pressing element 10 is connected to one end of the connecting rod 61.

The second end of the housing 20 is provided with a rotatable handle 50, and the other end of the connecting rod 61 is connected to the rotatable handle 50. When the rotatable handle 50 rotates, the connecting rod 61 follows. For example, when the rotatable handle 50 rotates counterclockwise, the connecting rod 61 can exert downward pressure on the pressing element 10, thereby driving the pressing element 10 to move downward.

When the toner cartridge 100 according to the present disclosure is inserted into the installation cavity 201 of the main body 200, and the pressing element 10 contacts the protective structure 220 (for example, the guide rail 225), the rotatable handle 50 transmits the force to the pressing element 10. The force acts on the guide rail 225 and compresses the first elastic element 224. The protective element 223 moves to the second position along the third direction and is separated from the first conductive contact 230, so that the first conductive contact 230 is exposed, that is, the protection of the first conductive contact 230 is released. The second conductive contact 42 moves to a position opposite to the first conductive contact 230, and the two are electrically connected.

Embodiment IV

The cartridge assembly provided by embodiments of the present disclosure can be detachably installed on the main body of the image forming apparatus 200, and the cartridge assembly includes multiple cartridges.

Specifically, the cartridge assembly can be inserted into the installation cavity 201 of the main body 200. The cartridge can be a toner cartridge 100, and the toner cartridge 100 contains toner for printing. Along the third direction, the cartridge assembly can be disposed above the imaging assembly 240. The cartridge assembly includes four toner cartridges 100 arranged sequentially along the first direction. Each cartridge can contain toners of different colors. Embodiments of the present disclosure do not limit this.

When the toner cartridge 100 is installed into the installation cavity and positioned, the toner cartridge 100 can provide toner to the imaging assembly 240. Specifically, the imaging assembly 240 includes a photosensitive drum, a cleaning blade, a discharger, a charging assembly, and a developing assembly, where the charging assembly uniformly charges the surface of the photosensitive drum. The exposing assembly uses a laser to expose and scan the photosensitive drum, so that the uniformly charged surface of the photosensitive drum carries an electrostatic latent image. The electrostatic latent image is developed through the developing assembly and toner, and transferred to the intermediate transfer belt. After the transfer is completed, the cleaning blade removes the toner remaining on the surface of the photosensitive drum, and the discharger removes the charge remaining on the photosensitive drum, making the photosensitive drum ready for the next imaging.

Furthermore, in order to easily distinguish each toner cartridge 100 mentioned above, the size of the pressing element 10 of each toner cartridge 100 can be different, thereby realizing foolproof processing. The foolproofing here means preventing the toner cartridge 100 in the cartridge assembly from being installed in a wrong position, such as a black toner cartridge 100 is installed into a position of a yellow toner cartridge 100, or the toner cartridge 100 is installed upside down in the main body 200. For example, in some embodiments, the size of each pressing element 10 is different, and the shape and structure may also be different, which is not limited by embodiments of the present disclosure.

Embodiment V

Referring to FIG. 3 to FIG. 7, an image forming apparatus provided by an embodiment of the present disclosure includes a main body 200 and the above-mentioned toner cartridge 100 or cartridge assembly. The main body 200 has an installation cavity 201. The toner cartridge 100 or cartridge assembly can be detachably installed in the main body 200. For example, the toner cartridge 100 can be inserted into the installation cavity 201, and when the toner in the toner cartridge 100 is exhausted, the toner cartridge 100 can be replaced.

Furthermore, the main body 200 is provided with a socket for inserting the toner cartridge 100, and the socket connects the installation cavity 201, so that the toner cartridge 100 can be inserted into the installation cavity 201 through the socket. The main body 200 also includes a first conductive contact 230 and a protective structure 220. The protective structure 220 and the first conductive contact 230 are disposed in the installation cavity 201. The protective structure 220 includes an installation frame 221, a bearing plate 222, a protective element 223, and a first elastic element 224. The installation frame 221 is provided on the rear frame 210 of the main body 200, and the installation frame 221 is used to install the bearing plate 222. The bearing plate 222 is slidably installed on the installation frame 221, and the bearing plate 222 can slide with respect to the installation frame 221 along the third direction.

The protective element 223 is disposed on a side of the bearing plate 222 away from the rear frame 210. The protective element 223 can be disposed oppositely to the first conductive contact 230 along the third direction and protect the first conductive contact 230. For example, the protective element 223 has a groove, and the first conductive contact 230 can be accommodated in the groove.

For example, the protective element 223 can be a flat plate. The edge of the protective element 223 is raised upward along the third direction to form a flange. The flange is arranged along the periphery of the protective element 223 to form a protective element 223 with a groove structure.

The first elastic element 224 is arranged between the bearing plate 222 and the installation frame 221. The expansion and contraction direction of the first elastic element 224 is consistent with the third direction. One end of the first elastic element 224 is connected to the bottom end of the bearing plate 222. The other end of the first elastic element 224 is connected to the installation frame 221, and the first elastic element 224 can provide elastic force along the third direction to the bearing plate 222. Under the action of the elastic force, the bearing plate 222 and the protective element 223 can move up and down along the third direction.

In embodiments of the present disclosure, the protective element 223 is configured such that when the toner cartridge 100 is not inserted into the main body of the image forming apparatus 200, the protective element 223 is in the first position, and the first conductive contact 230 is located in the groove of the protective element 223, that is, the protective element 223 protects the first conductive contact 230.

When the toner cartridge 100 is inserted into the main body of the image forming apparatus 200 and installed in place, the pressing element 10 of the toner cartridge 100 contacts the bearing plate 222 and applies pressure to the bearing plate 222 to compress the first elastic element 224. The protective element 223 descends along the third direction with the bearing plate 222 to the second position. The protective element 223 maintains a certain distance from the first conductive contact 230. The first conductive contact 230 is exposed, and the protection of the first conductive contact 230 by the protective element 223 is released. Thus, the second conductive contact 42 is electrically connected to the first conductive contact 230.

With this arrangement, the image forming apparatus provided by embodiments of the present disclosure can cooperate with the protective structure 220 during the process of replacing the toner cartridge 100, so that the protective element 223 protects the first conductive contact 230 and prevents the first conductive contact from being adhered to toner. Or the first conductive contact 230 is contaminated or damaged, so that the second conductive contact 42 of the replaced toner cartridge 100 is in stable contact with the first conductive contact 230, thereby ensuring the normal operation of the image forming apparatus.

The installation frame 221 in embodiments of the present disclosure includes a first gate body 2211 and a second gate body 200. The first gate body 2211 and the second gate body 2212 extend along the third direction, and the first gate body 2211 and the second gate body 2212 are opposite to and spaced apart from each other along the first direction on the rear frame 210. The first gate body 2211 and the second gate body 2212 are located at an insertion opening of the toner container.

The first gate body 2211 and the second gate body 2212 are respectively slidingly connected to both sides of the bearing plate 222. Side walls of the first gate body 2211 and the second gate body 2212 that are close to each other are respectively provided with slide slots, and the slide slots extend along the third direction. Both sides of the bearing plate 222 are respectively slidably installed in the slide slots. Furthermore, slide rails are respectively provided on both sides of the bearing plate 222. The slide rails cooperate with the slide slots, that is, the bearing plate 222 is slidably installed in the slide slots of the installation frame 221 through the slide rails.

It should be noted that the first gate body 2211 and the second gate body 2212 in embodiments of the present disclosure can be detachably installed on the rear frame 210. A first elastic element 224 is respectively disposed between the bottom of the first gate body 2211, the bottom of the second gate body 2212, and the bearing plate 222. The expansion and contraction direction of the first elastic element 224 is consistent with the third direction, and is used to provide elastic force to the bearing plate 222.

In embodiments of the present disclosure, the bearing plate 222 is also provided with a force-bearing arm. When the toner cartridge 100 is inserted into the installation cavity 201 of the main body 200, the force-bearing arm is configured to contact the pressing element 10 of the toner cartridge 100 and receive the force from the toner cartridge 100, causing the first elastic element 224 to shrink. The force-bearing arm is disposed on a side of the bearing plate 222 away from the rear frame 210. A first end of the force-bearing arm is connected to the bearing plate 222. A second end of the force-bearing arm extends along the second direction, and the extension direction is consistent with the insertion direction of the toner cartridge 100.

For example, in one embodiment, in order to guide the toner cartridge 100 when it is inserted into the main body 200, two guide rails 225 are respectively provided on both sides of the bearing plate 222 in embodiments of the present disclosure. The two guide rails 225 are arranged oppositely and spaced apart along the first direction, and each guide rail 225 is configured as the force-bearing arm.

The first end of the guide rail 225 is connected to the bearing plate 222, and the second end of the guide rail 225 is in contact with the pressing element 10 of the toner cartridge 100. The second end of the guide rail 225 is provided with a connected second guide slope 2251 and a connected second horizontal bearing surface 2252. The second guide slope 2251 is located on a side of the second horizontal bearing surface 2252 away from the bearing plate 222 and extends obliquely downward. That is, when the toner cartridge 100 is inserted into the installation cavity 201, the second guide slope 2251 first contacts the pressing element 10.

It should be noted that in this embodiment, the pressing element 10 also includes a first horizontal bearing surface 12 connected with the first guide slope 11, and the first guide slope 11 can be adhered to the second guide slope 2251. The first horizontal bearing surface is adhered to the second horizontal bearing surface 2252.

When the toner cartridge 100 is inserted into the installation cavity 201 of the main body 200, and the first guide slope 11 is adhered to the second guide slope 2251, the first guide slope 11 can exert pressure on the first elastic member 224. Thus, the guide rail 225 moves upward along the third direction, thereby moving the protective element 223 from the first position to the second position. The protective element 223 moves to above the first conductive contact 230, exposing the first conductive contact 230, thereby releasing the protection of the first conductive contact 230.

As the toner cartridge 100 continues to be inserted along the second direction, when the first horizontal bearing surface 12 is adhered to the second horizontal bearing surface 2252, the protective structure 220 and the toner cartridge 100 can be limited in the third direction. Thus, the protective element 223 is in the second position. With the toner cartridge 100 installed in place, the first conductive contact 230 contacts with the second conductive contact 42 and are electrically connected.

To reduce the friction force when the first guide slope 11 is adhered to the second guide slope 2251, the second guide slope 2251 can be provided with a second roller 226. The second roller 226 is rotatably disposed on the second guide slope 2251. The second roller 226 is rotatably disposed at the second guide slope 2251, and at least part of the outer peripheral surface of the second roller 226 protrudes from the second guide slope 2251. Thus, when the first guide slope 11 is adhered to the second guide slope 2251, the first guide slope 11 can contact the outer peripheral surface of the second roller 226, thereby reducing the friction force when the first guide slope 11 contacts the second guide slope 2251.

Further, in order to reduce the friction force when the first guide slope 11 is adhered to the second guide slope 2251, the first guide slope 11 is provided with a first roller 13, and at the same time, the second guide slope 2251 is provided with a second roller 226. Embodiments of the present disclosure do not limit this.

Figure 28:
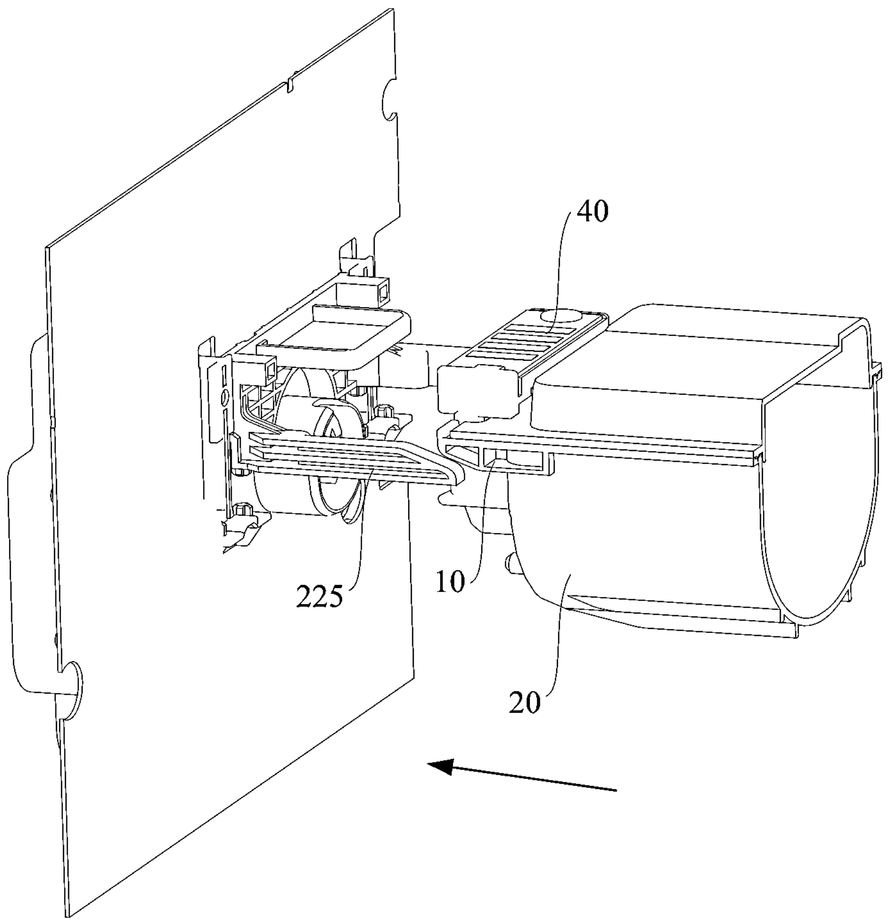
FIG. 28 illustrates a first schematic diagram of the state of the driving assembly when the toner cartridge according to various embodiments of the present disclosure being not inserted into the main body.
Figure 29:
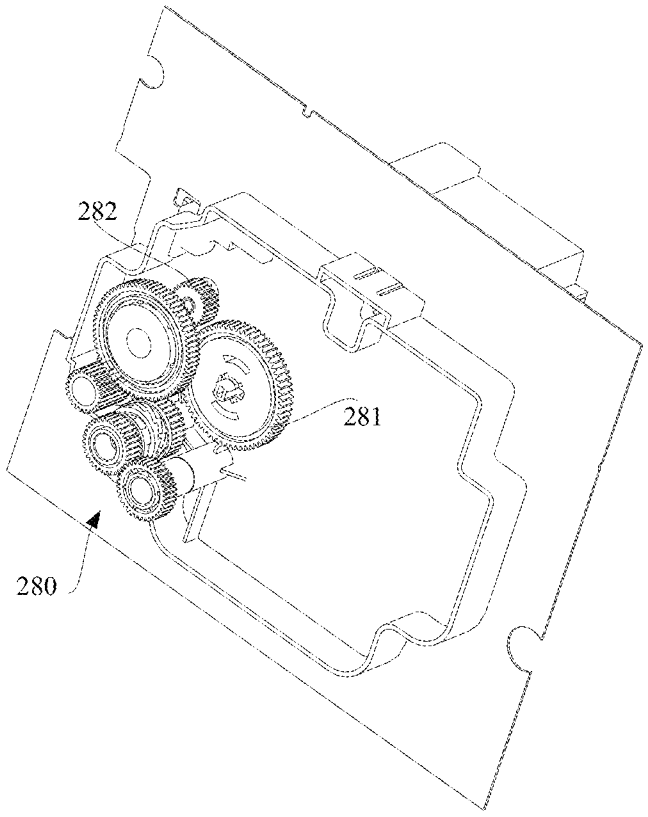
FIG. 29 illustrates a second schematic diagram of the state of the driving assembly when the toner cartridge according to various embodiments of the present disclosure being not inserted into the main body.

As shown in FIG. 28 and FIG. 29, in the image forming apparatus provided by the embodiments of the present disclosure, a linkage component is also provided in the main body 200. The linkage component is connected to the driving assembly 280 of the main body 200. The driving assembly 280 includes a first gear 281 and a second gear 282. The rotation axes of the first gear 281 and the second gear 282 are parallel.

The linkage component is linked with the second gear 282. The linkage component is configured such that when the toner cartridge 100 is installed into the main body 200 and is installed in place, the linkage component moves and meshes the second gear 282 with the first gear 281. Then, the entire driving assembly 280 starts working. On the contrary, when the toner cartridge 100 is not installed in the main body 200, the first gear 281 and the second gear 282 remain separated.

Embodiment VI

An image forming apparatus provided by embodiments of the present disclosure include a main body 200 and a cartridge. In a type of cartridge shown in this embodiment, a photosensitive drum, a charging roller, and a developing device that stores toner are integrated to form a cartridge. The cartridge is configured to be removable from the main body 200 of the image forming apparatus. Further, although the cartridge described above is an example, the present disclosure does not limit. For example, a developing cartridge may be used including toner and a developing device without a photosensitive drum. It is also possible to use a toner cartridge that does not include a roller. Alternatively, it is also possible to use a photosensitive drum cartridge that does not include a developing device but integrates a photosensitive drum and a charging roller.

It should be noted that the working process of the image forming apparatus provided by embodiments of the present disclosure is listed below.

Figure 30:
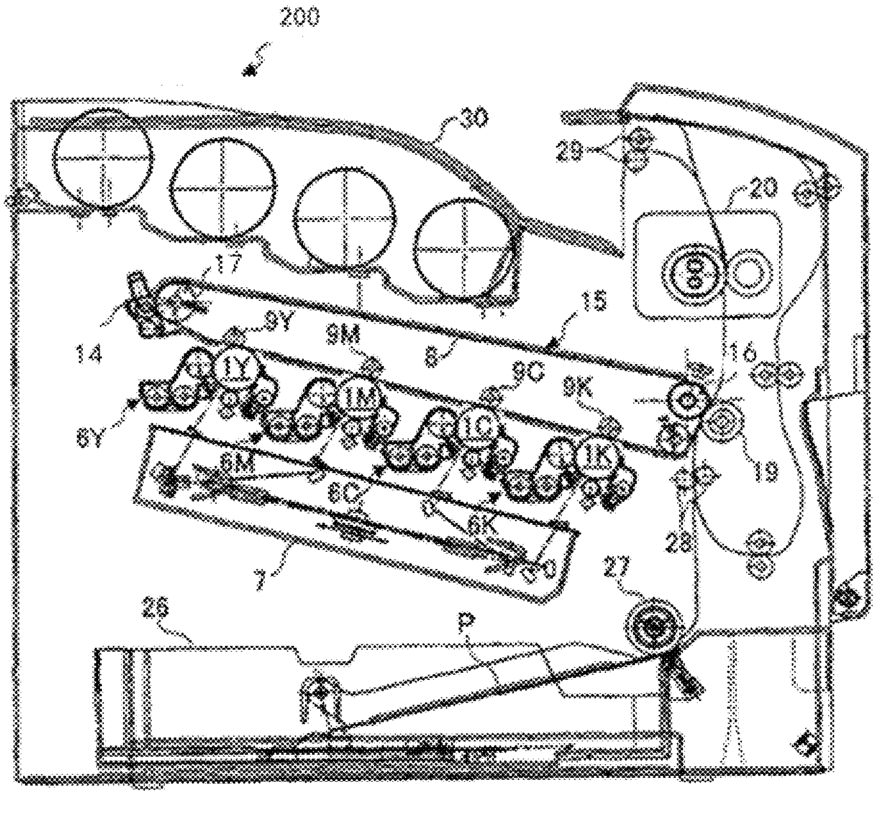
FIG. 30 illustrates a schematic diagram of the printing process of the image forming apparatus according to various embodiments of the present disclosure.

As shown in FIG. 30, the image forming apparatus may be a printer provided with four cartridges 6Y, 6M, 6C and 6K that produce yellow, magenta, cyan, and black toner images (referred to as Y, M, C, and K toner images). The toner cartridge respectively uses Y, M, C, and K toners of different colors from each other as image forming substrates, but the four toner cartridges have the same structure and can be replaced with a toner cartridge every time the toner is replenished. For example, description will be given assuming that the toner cartridge 6Y that produces a Y toner image as a representative example of four toner cartridges.

The toner cartridge 6Y includes a drum-shaped photoconductor 1Y, a drum cleaning apparatus, a discharger (not shown), a charging apparatus, and a developing apparatus. The toner cartridge 6Y is detachably installed on the main body, and these parts can be replaced at one time. The charging apparatus uniformly charges the surface of the photoconductor rotated in a clockwise rotation direction by a driving unit (not shown). Exposure scanning is carried out by laser light L, where the surface of the uniformly charged photoconductor carries an electrostatic latent image. The electrostatic latent image is developed by a developing apparatus using Y toner for the Y toner image.

Further, intermediate transfer is performed on the intermediate transfer belt 8. After passing through the intermediate transfer process, the drum cleaning apparatus removes the toner remaining on the surface of the photoconductor. Furthermore, after cleaning, the discharger discharges any residual charge from the photoconductor. The surface of the photoconductor is initialized by discharging, which prepares it for subsequent imaging. Likewise, in the other toner cartridges 6M, 6C, and 6K, the M, C, and K toner images are similarly formed on the photoconductors 1M, 1C, and 1K, and intermediate transfer is performed on the intermediate transfer belt 8.

An exposure apparatus 7 is provided in a lower part of each of the toner cartridges 6Y, 6M, 6C and 6K. The exposure apparatus 7 serving as a latent image forming unit irradiates each photoconductor in the toner cartridges 6Y, 6M, 6C, and 6K with the laser light L emitted based on the image information, and exposes each photoconductor with the laser light L.

Regarding exposure, electrostatic latent images of Y, M, C and K are formed on the photoconductors 1Y, 1M, 1C and 1K. In addition, the exposure apparatus 7 irradiates the light conductor through two or more optical lenses and reflecting mirrors, and scans the laser light (L) emitted from the light source by means of a polygonal mirror rotated by a rotation driving motor. A paper feeding unit including a paper receiving cassette 26 is provided in the bottom of the exposure device 7, and a paper feeding roller 27 and a counter roller pair 28 are provided in the paper receiving cassette.

In the paper receiving cassette 26, a large amount of copy paper P is accommodated, and the paper feeding roller 27 is in contact with the copy paper P on the top of the large amount of copy paper. When the paper feeding roller 27 rotates counterclockwise due to the driving unit, the top copy paper P is conveyed to a position between the rollers of the counter roller pair 28. Although the counter roller pair 28 performs rotational driving of the rollers to clamp the copy paper P, the rotational driving is immediately stopped. The copy paper P is conveyed to the secondary transfer nip area by the counter roller pair 28 at an appropriate time. In the paper feeding unit, the combination of the paper feeding roller 27 and the counter roller pair 28 (timing roller pair) is used to configure the conveying unit. This conveying unit conveys the copy paper P from the paper receiving cassette 26 to the secondary transfer nip.

An intermediate transfer unit 15 that performs intermediate image transfer using a circular intermediate transfer belt 8 (intermediate transfer medium) is provided at the upper part of each of the toner cartridges 6Y, 6M, 6C, and 6K. The intermediate transfer unit 15 is equipped with four primary transfer bias rollers 9Y, 9M, 9C and 9K, a cleaning apparatus 14, and an intermediate transfer belt 8. In addition, the intermediate transfer unit 15 includes a secondary transfer support roller 16, a cleaning support roller 17, a tension roller, and the like. As the intermediate transfer belt 8 rotates counterclockwise, circular transfer is performed by rotational driving of at least one of these three rollers. In this way, the primary transfer bias rollers 9Y, 9M, 9C and 9K place the intermediate transfer belt 8 for circular transfer between the photoconductors 1Y, 1M, 1C and 1K, and form primary transfer nip area respectively.

In this transfer, the toner presses the transfer bias of opposite polarity (for example, positive pole) toward the back surface of the intermediate transfer belt 8 (the inner surface of the ring). All rollers except the primary transfer bias rollers 9Y, 9M, 9C and 9K are electrically grounded.

Along with the circular transfer, the intermediate transfer belt 8 undergoes the process of passing through the Y, M, C, and K primary transfer nip areas one by one. The Y, M, C, and K toner images of the photoconductors 1Y, 1M, 1C, and 1K are superimposed, which are first-level transferred. Therefore, a toner image in which four colors are superimposed (referred to as a four-color toner image) is formed on the intermediate transfer belt 8.

In the secondary transfer nip, which is inserted between the intermediate transfer belt 8 and the secondary transfer roller 19, in which the copy paper P performs surface transfer in the forward direction, and an opposite direction to the counter roller pair 28 sideways.

When the copy paper P sent out from the secondary transfer nip passes between the rollers of the fixing apparatus 20, the four-color toner images transferred on the surface are fixed using heat and pressure. Subsequently, the copy paper P is transported through the discharge roller pair 29 and discharged to the outside of the printer. A stacking part 30 is provided on the upper surface of the main part of the printer. The copy papers P discharged from the discharge roller pair 29 to the outside of the printer are stacked one by one on the stacking part 30.

What is claimed is:

1. An adapter, installed on a cartridge, wherein the cartridge is detachably disposed on a main body of an image forming apparatus; the main body of the image forming apparatus comprises a first conductive contact and a protective structure; the protective structure is disposed on a rear frame of the main body of the image forming apparatus; the protective structure comprises a protective element; and when the cartridge is not inserted into the main body of the image forming apparatus, the protective element is in a first position to protect the first conductive contact;

the cartridge comprises a housing, an accommodation part, and a second conductive contact; the accommodation part is disposed on the housing; and the second conductive contact is used to electrically connect with the first conductive contact; and the adapter comprises a pressing element; the pressing element is used to cooperate with the protective structure; when the adapter is installed on the cartridge as well as the cartridge is inserted into the main body of the image forming apparatus and installed in place, the protective element is in a second position and accommodated in the accommodation part; and the protective element releases a protection of the first conductive contact, achieving an electrical connection between the second conductive contact of the cartridge and the first conductive contact.

2. The adapter according to claim 1, further comprising an installation structure, wherein the installation structure is used to install the pressing element on the housing of the cartridge; and the installation structure comprises an installation part for detachably disposing the pressing element on the house of the cartridge.

3. The adapter according to claim 1, wherein the pressing element comprises a first guide slope; and when the adapter is installed on the cartridge as well as the cartridge is inserted into the main body of the image forming apparatus, along an insertion direction of the cartridge, the first guide slope is inclined upward.

4. The adapter according to claim 1, wherein the pressing element comprises a first guide slope; and when the adapter is installed on the cartridge as well as the cartridge is inserted into the main body of the image forming apparatus, along an insertion direction of the cartridge, compared with an end surface of the cartridge, the first guide slope is closer to a side of the main body of the image forming apparatus.

5. The adapter according to claim 1, wherein the pressing element comprises a first guide slope and a first horizontal bearing surface that is connected to the first guide slope; and when the adapter is installed on the cartridge as well as the cartridge is inserted into the main body of the image forming apparatus, along an insertion direction of the cartridge, compared with the first horizontal bearing surface, the first guide slope is closer to a side of the main body of the image forming apparatus.

6. The adapter according to claim 1, wherein the pressing element comprises a first guide slope and a first horizontal bearing surface that is connected to the first guide slope; the protective structure further comprises a guide rail and a first elastic element; and the guide rail comprises a second guide slope and a second horizontal bearing surface that is connected to the second guide slope; and when the first guide slope is configured to be adhered to the second guide slope, the first guide slope exerts pressure on the first elastic element to move the protective element from the first position to the second position; and when the first horizontal bearing surface is configured to be adhered to the second horizontal bearing surface, the protective element is in the second position.

7. A cartridge, detachably disposed on a main body of an image forming apparatus, wherein the main body of the image forming apparatus comprises a first conductive contact and a protective structure; the protective structure is disposed on a rear frame of the main body of the image forming apparatus; the protective structure comprises a protective element; and when the cartridge is not inserted into the main body of the image forming apparatus, the protective element is in a first position to protect the first conductive contact; and the cartridge comprises:

a housing, having an end surface;

a second conductive contact, configured to electrically connect the first conductive contact;

an accommodation part, which is disposed on the housing; and a pressing element, which is disposed on the housing and configured to cooperate with the protective structure; when the cartridge is inserted into the main body of the image forming apparatus and installed in place, the protective element being in a second position and accommodated in the accommodation part; and the protective element releasing a protection of the first conductive contact, and achieving an electrical connection between the second conductive contact and the first conductive contact.

8. The cartridge according to claim 7, wherein the pressing element comprises a first guide slope; during the process of inserting the cartridge into the main body of the image forming apparatus, along an insertion direction of the cartridge, the first guide slope is inclined upward.

9. The cartridge according to claim 7, wherein the pressing element comprises a first guide slope; during the process of inserting the cartridge into the main body of the image forming apparatus, along an insertion direction of the cartridge, compared with an end surface of the cartridge, the first guide slope is closer to a side of the main body of the image forming apparatus.

10. The cartridge according to claim 9, wherein the second conductive contact is movably disposed; when the cartridge is inserted into the main body of the image forming apparatus and installed in place as well as the protective element is in the second position and accommodated in the accommodation part, the second conductive contact is electrically connected to the first conductive contact.

11. The cartridge according to claim 9, wherein along a first direction, the second conductive contact is located on a top of the housing, the first direction being a length direction of the main body of the image forming apparatus.

12. The cartridge according to claim 7, wherein the pressing element comprises a first guide slope and a first horizontal bearing surface that is connected to the first guide slope; during the process of inserting the cartridge into the main body of the image forming apparatus, along an insertion direction of the cartridge, compared with the first horizontal bearing surface, the first guide slope is closer to a side of the main body of the image forming apparatus.

13. The cartridge according to claim 7, wherein the pressing element comprises a first guide slope and a first horizontal bearing surface that is connected to the first guide slope; the protective structure further comprises a guide rail and a first elastic element; and the guide rail comprises a second guide slope and a second horizontal bearing surface that is connected to the second guide slope; and the pressing element cooperates with the guide rail; when the first guide slope is adhered to the second guide slope, the cartridge exerts pressure on the first elastic element to move the protective element from the first position to the second position; and when the first horizontal bearing surface is adhered to the second horizontal bearing surface, the protective element is in the second position.

14. The cartridge according to claim 7, further comprising a bracket and a storage apparatus installed on the bracket, wherein the storage apparatus comprises the second conductive contact; and the bracket, the storage apparatus, and the housing surround the accommodation part, and the accommodation part has an opening that cooperates with the protective element; or the bracket is provided with the accommodation part, and the accommodation part has the opening that cooperates with the protective element.

15. The cartridge according to claim 14, wherein the second conductive contact is disposed on a side away from the accommodation part; and the second conductive contact is configured to, when the cartridge is inserted into the main body of the image forming apparatus and installed in place as well as the protective element is in the second position and accommodated in the accommodation part, be electrically connected to the first conductive contact.

16. The cartridge according to claim 14, wherein the second conductive contact is in the accommodation part;

the first conductive contact is disposed in a groove of the protective element; and when the cartridge is inserted into the main body of the image forming apparatus and installed in place, and the protective element is in the second position and accommodated in the accommodation part, the first conductive contact and the second conductive contact are electrically connected.

17. The cartridge according to claim 14, further comprising a first protective cover, wherein the first protective cover is slidably installed on the bracket and covers the second conductive contact; the first protective cover is configured to, when the cartridge is inserted into the main body of the image forming apparatus and installed in place as well as the protective element is in the second position and accommodated in the accommodation part, be pushed by the protective element for sliding, exposing the second conductive contact.

18. The cartridge according to claim 17, wherein a second elastic element is provided between the first protective cover and the bracket; and the second elastic element is configured to provide an elastic force to the first protective cover; when the cartridge is inserted into the main body of the image forming apparatus and installed in place as well as the protective element is in the second position and accommodated in the accommodation part, the second elastic element is compressed and slides the first protective cover to expose the second conductive contact; and when the protective element is separated from the accommodation part, the second elastic element is reset, making the first protective cover to cover the second conductive contact.

19. The cartridge according to claim 7, further comprising an adapter component that is electrically connected to the second conductive contact, wherein the adapter component is disposed on a top of the housing;

the adapter component is configured to, when the cartridge is inserted into the main body of the image forming apparatus and installed in place as well as the protective element is in the second position and accommodated in the accommodation part, be electrically connected to the first conductive contact.

20. An image forming apparatus, comprising:

a main body provided with a socket for inserting a cartridge, the main body including a first conductive contact and a protective structure, wherein the protective structure includes an installation frame, a bearing plate, a protective element, and a first elastic element, the installation frame is provided on a rear frame of the main body, and the installation frame is used to install the bearing plate, and the bearing plate is able to slide with respect to the installation frame along a third direction, the third direction being a height direction of the main body of the image forming apparatus, the protective element is disposed on a side of the bearing plate away from the rear frame, the protective element is disposed oppositely to the first conductive contact, the first elastic element is arranged between the bearing plate and the installation frame, and the first elastic element provides elastic force along the third direction to the bearing plate, when the cartridge is not inserted into the main body of the image forming apparatus, the protective element is in a first position, the protective element protects the first conductive contact, when the cartridge is inserted into the main body of the image forming apparatus and installed in place, the protective element is in a second position, protection of the first conductive contact by the protective element is released, and a second conductive contact is electrically connected to the first conductive contact.

* * * * *